United States Patent
Tsuchitani et al.

(10) Patent No.: US 6,194,344 B1
(45) Date of Patent: Feb. 27, 2001

(54) PROCESS FOR PREPARING CARBONACEOUS MATERIAL CARRYING ULTRAFINELY DISPERSED METAL

(75) Inventors: Masatoshi Tsuchitani; Ryoichi Nakajima, both of Ichihara; Kiyotaka Suzuki, Sodegaura; Hitoshi Shigematsu; Katsutoshi Nishitani, both of Ichihara, all of (JP)

(73) Assignee: Maruzen Petrochemical Co., LTD, Tokyo (JP)

( * ) Notice: Subject to any disclaimer, the term of this patent is extended or adjusted under 35 U.S.C. 154(b) by 0 days.

(21) Appl. No.: 09/414,288

(22) Filed: Oct. 7, 1999

Related U.S. Application Data

(63) Continuation of application No. 08/870,768, filed on May 16, 1997, now abandoned.

(30) Foreign Application Priority Data

May 31, 1996 (JP) .................................................. 8-161196
Sep. 30, 1996 (JP) .................................................. 8-276970

(51) Int. Cl.$^7$ .............................. B01J 21/18; C10C 1/04; C01B 31/00; D01F 9/12
(52) U.S. Cl. ........................... 502/174; 502/180; 502/182; 502/416; 502/418; 208/22; 208/39; 208/41; 208/43; 208/44; 208/45; 423/414; 423/445 R; 423/447.1; 423/447.2; 423/447.3; 423/447.4; 423/447.6
(58) Field of Search ..................... 502/174, 180, 502/182, 416, 418; 208/22, 41, 43–45, 39; 423/447.1, 445 R, 447.4, 447.3, 447.2, 447.6, 414

(56) References Cited

U.S. PATENT DOCUMENTS

| | | | |
|---|---|---|---|
| 3,909,449 | * 9/1975 | Nagai et al. ........................ | 502/9 |
| 5,181,979 | * 1/1993 | Uemura et al. ...................... | 156/89 |
| 5,230,960 | * 7/1993 | Iizuka ................................. | 428/408 |
| 5,736,030 | * 4/1998 | Tsuchitani et al. ................. | 208/45 |

\* cited by examiner

Primary Examiner—Mark L. Bell
Assistant Examiner—Patricia L. Hailey
(74) Attorney, Agent, or Firm—Melvin I. Stoltz

(57) ABSTRACT

A process for the preparation of a high-softening-point pitch rich in mesopores having a softening point measured by temperature gradient method of 150° C. or higher, a weight loss by heating up to 300° C. of 5 wt. % or less and mesopores of 100 mm$^3$/g or greater, in terms of minute pore volume calculated by the Dollimore-Heal method, and a process for making carbonaceous materials carrying metal thereon are disclosed. The high-softening-point pitch rich in mesopores can easily provide carbonaceous material carrying metal thereon by using no oxidizing agent such as nitric acid, and, therefore, the high-softening-point pitch rich in mesopores is especially suitable for the production of carbonaceous materials carrying metal thereon or highly crystalline graphitized carbonaceous materials in a short heating time. The process for the production of a high-softening-point pitch rich in mesopores comprises forming micro-shaped carbonaceous materials having a size of 100 μm or less, and contacting the micro-shaped carbonaceous materials with an extracting organic solvent so as to remove 20–90 wt. % of light components from the micro-shaped carbonaceous materials. A carbonaceous material carrying metal thereon can easily be prepared by contacting the high-softening point pitch rich in mesopores with an aqueous solution of an anionic surface active agent, and then contacting the material treated with the surface active agent with an aqueous solution of metal salts.

12 Claims, 10 Drawing Sheets

PROCESS FOR PREPARING CARBONACEOUS MATERIAL CARRYING ULTRAFINELY DISPERSED METAL

This application is a continuation of application Ser. No. 08/870,768, filed May 16, 1997, now abandoned.

BACKGROUND OF THE INVENTION

1. Field of the Invention

The present invention relates to a process for preparing high-softening point pitch rich in mesopores and a high-softening-point pitch prepared thereby, and a process for preparing carbonaceous material carrying ultrafinely dispersed metal.

2. Description of the Prior Art

Carbonaceous materials carrying a metal have conventionally been utilized as catalysts for various reactions. In recent years, various carbonaceous materials carrying a metal with new functions have been developed. Examples of such carbonaceous materials include a deodorant comprising metallic silver or manganese carried on activated carbon which possesses the function of decomposing bad odors; an adsorbent obtained by carbonizing or activating an organic material containing a metal complex which is useful for adsorbing and separating saccharides, vitamine, dyes, and macro-molecules such as humus contained in raw city water; and an iron-containing carbonaceous magnetic material obtained by decomposing an organic material containing iron. It is expected that application of these carbonaceous materials utilizing these new functions will expand in the future.

A method comprising impregnating activated carbon with an aqueous solution of a metal salt has generally been known as the method for causing a metal to be carried on carbon. Because the crystal and pore structures of carbon are dominated by the type of activated carbon used in this method, it was difficult to intentionally control the crystal and pore structures to provide target functions with the carbonaceous material.

Therefore, several methods have been proposed for controlling homogeneous metal dispersion and minute pore structure by heat treatment of these materials after the metal has been carried on, or in the presence of a metal.

Examples of such methods include a method for producing a mixture of a metal oxide with a ultrafine diameter and an organic substance such as phenol resin, subjecting the mixture to dry distillation under heating, and then carbonizing the resulting product (U.S. Pat. No. 4,970,189); a method for coordinating a metal on a high-molecular-weight compound containing an atomic group which has coordination ability in the main chain and/or side chains, and treating the resulting high-molecular-weight organic compound containing metal with heat (Japanese Patent Application Laid-opens No. He 2(1990)-6309, No. Hei 2(1990)-6310, No. Hei 2(1990)-6311, No. Hei 2(1990)-6312, No. Hei 2(1990)-6313); and a method comprising producing a mixture of pitch and an organometallic compound and stabilizing this mixture, followed by activation or carbonization (Japanese Patent Application Laid-open No. Hei 3(1991)-265510).

These methods, however, have some drawbacks. For example, it is difficult to obtain a homogeneously dispersed ultrafine metallic compound in an organic substance, because the ultrafine particles of metallic compound may agglomerate and precipitate during the operation. The organic metal complex soluble in an organic solvent or in pitch which is used in these methods is an expensive, special complex. An increase in the production cost of the resulting carbonaceous material is thus unavoidable.

Moreover, the following methods using raw materials which are obtained from heavy oil have been proposed as methods for producing carbonaceous materials carrying a metal: a method comprising oxidizing a mesophase pitch by an oxidizing agent such as nitric acid, preparing a mixture of the resulting aromatic condensation compound possessing a hydrophilic group, a solution of a metal salt, and an alkaline aqueous solution, and decomposing this mixture of alkaline aqueous solution (Japanese Patent Application Laid-open No. Hei 5(1993)-59414); a method comprising treating a carbonaceous bituminous material with an oxidizing agent to introduce a functional group, dissolving the resulting product in a specific organic solvent, adding an organic metal complex dissolvable in this organic solvent, allowing the mixture to gel, and calcining the resulting carbonaceous gel (Japanese Patent Application Laid-open No. Hei (5(1993)-320662); a method comprising treating a carbonaceous material such as raw coke with an oxidizing agent to introduce a functional group, causing the oxidizing product to come into contact with a metal salt, and calcining the resulting product in an inert atmosphere (Japanese Patent Application Laid-open No. Hei 6(1994)-40771); and the like. All these methods require oxidizing a raw material with an oxidizing agent such as nitric acid to introduce a functional group. To introduce a sufficient amount of functional groups it is necessary to use several tens times as much oxidizing agent as the amount of the raw material, requiring large equipment and a high cost for washing the product obtained by the oxidation treatment and for treating waste fluid. In addition, when a high-softening-point pitch such as a mesophase pitch is used as a raw material, manufacture of this mesophase pitch itself requires complicated processing such as heat treatment at high temperature and polymerization using a catalyst, which make the manufacturing process unstable and increase the production cost.

On the other hand, as the method using an organic compound which originally possesses a functional group as a starting material, a method is proposed comprising emulsion polymerizing an $\alpha,\beta$-unsaturated monomer containing specific functional group to obtain polymer particles, causing a metal in the form of a metal complex to bond as a ligand with the specific functional group existing on the surface, and calcining the resulting product (Japanese Patent Application Laid-open No. 5(1993)-98302). This method can utilize only the functional groups existing on the surface of polymer particles. Accordingly, the method can be carried only on the surface of the carbonaceous material.

SUMMARY OF THE INVENTION

In view of this situation, a first object of the present invention is to provide a process for manufacturing a high-softening-point pitch having mesopores which allow metals to enter homogeneously inside of the particles using inexpensive raw materials and without requiring complicated pretreatment of such raw materials such as heat treatment and/or catalytic polymerization. As far as we know, there is no report concerning with a high-softening-point pitch rich in mesopores having a softening point measured by temperature gradient method of 150° C. or higher, a weight loss by heating up to 300° C. of 5 wt. % or less, a specific surface area measured by BET 1 point method of 44 $m^2/g$ or greater, and a pore volume of 100 $mm^3/g$ or greater. Such a porous high-softening-point pitch is not only usable as an intermediate for the production of a carbonaceous material containing metal finely dispersed form but also expected as an adsorbent for macromolecules such as humus, and the like.

A second object of the present invention is to provide a process for efficiently manufacturing a carbonaceous material with a metal homogeneously carried thereon from the high-softening-point pitch having mesopores without using an oxidizing agent, such as nitric acid, for which the handling is complicated.

Other objects of the present invention will be apparent to the persons in the art from the detailed descriptions, examples and drawings shown hereunder.

We previously found that a carbonized material with uniform minute pores can be very easily and drastically obtained using a heavy oil with specific properties as a starting material, by shaping this raw material into a micro-shaped material in the form of particles, powder, or fibers, removing light components from this micro-shaped material by extraction with an organic solvent, thereby obtaining a high-softening-point pitch, stabilizing this pitch by causing oxygen to be incorporated therein while heating under an atmosphere contained oxygen, and carbonizing under specific conditions (U.S. Ser. No. 08/749,932 filed on Nov. 14, 1996), now abandoned.

We have given attention to the fact that the high-softening-point pitch obtained in the course of the process of the invention mentioned just above, that is, the high-softening-point pitch obtained from a heavy oil with specific properties by shaping this heavy oil into a micro-shaped material in the form of particles, liquid particles, powder, or fibers, and removing light components from the micro-shaped material by extraction with an organic solvent, is largely different from conventional high-softening-point pitch obtained by heat treatment and the like in its properties and behaviors when the pitch is subjected to stabilization, calcining, or carbonization, and have continued further studies. As a result, we have found that a high-softening-point pitch obtained by extracting light components under specific conditions contains mesopores of 20–500 Å, that these mesopores easily adsorb surface active agents, and that when an anionic surface active agent is adsorbed, a cationic exchange reaction occurs in an aqueous solution containing a metal ion, thereby ensuring production of a high-softening-point pitch with various kinds of metals carried thereon. We further found that when this high-softening-point pitch with a metal carried thereon is processed by stabilization, carbonization, or graphitization, a carbonaceous material carrying this metal as is can be obtained. These findings have led to the completion of the present invention.

Accordingly, the gist of a first invention resides in a process for manufacturing a high-softening-point pitch having a softening point measured by the temperature gradient method of 150° C. or higher, a weight less by heating up to 300° C. of 5 wt. % or less, and mesopores of 100 mm$^3$/g or greater, in terms of minute pore volume calculated by the Dollimore-Heal method from an adsorption isotherm of nitrogen at liquid nitrogen temperature, which comprises using a heavy oil having an H/C atomic ratio in the range of 0.8–1.2 and substantially free from components insoluble in BTX solvent, or a low-softening-point pitch derived from this heavy oil by distilling off light components therefrom, as a starting material.

(a first step)

shaping this raw material into a micro-shaped material in the form of particles, liquid particles, powder, or fibers with a size of 100 μm or less.

(a second step)

causing this micro-shaped material to come into contact with an organic solvent which allows at least 10 wt. % of the micro-shaped material to remain insoluble as insoluble components, and extracting 20–90 wt. % of the light components contained in the micro-shaped material so as to increase the softening point of the micro-shaped material measured by the temperature gradient method of 150° C. or higher.

The gist of a second invention resides in a process for manufacturing a high-softening-point pitch carrying a metal thereon which comprises causing the high-softening-point pitch produced in the first invention mentioned above to come into contact with an anionic surface active agent to obtain a high-softening-point pitch on which the anionic surface active agent has been adsorbed, and causing this high-softening-point pitch on which the anionic surface active agent has been adsorbed to come into contact with an aqueous solution of a metal salt to replace the cation of the surface active agent with the metal ion.

The gist of a third invention resides in a process for manufacturing a stabilized carbonaceous material carrying a metal thereon, which comprises stabilizing the high-softening-point pitch carrying a metal thereon prepared in the second invention mentioned above by heating under an atmosphere containing oxygen.

The gist of a fourth invention resides in a process for manufacturing a carbonaceous material carrying a metal thereon, which comprises thermally treating the stabilized material prepared in the third invention mentioned above under an inert atmosphere at a temperature of from 500° C. to 3,000° C. or under an atmosphere containing at least one oxidative gas selected from the group consisting of steam and carbon dioxide at a temperature of from 500° C. to 1,500° C.

The gist of a fifth invention is to provide a process for manufacturing a molded article of a carbonaceous material with a metal carried thereon, which comprises molding a molded article using the stabilized carbonaceous material carrying a metal thereon obtained in the third invention mentioned above, or the carbonaceous material carrying a metal thereon obtained in the fourth invention mentioned above as a filler and the high-softening-point pitch obtained in the first invention mentioned above or the high-softening-point pitch carrying a metal obtained in the second invention mentioned above as a binder, and processing this molded article by stabilization, carbonization or graphitization.

The gist of a sixth invention is to provide a high-softening-point pitch rich in mesopores having a softening point measured by temperature gradient method of 150° C. or higher, a weight loss by heating up to 300° C. of 5 wt. % or less, a specific surface area measured by BET 1 point method of 44 m$^2$/g or greater, and a pore volume of 100 m$^3$/g or greater calculated by Dollimore-Heal method.

DRAWINGS

DETAILED DESCRIPTION OF THE INVENTION

Figure 1:
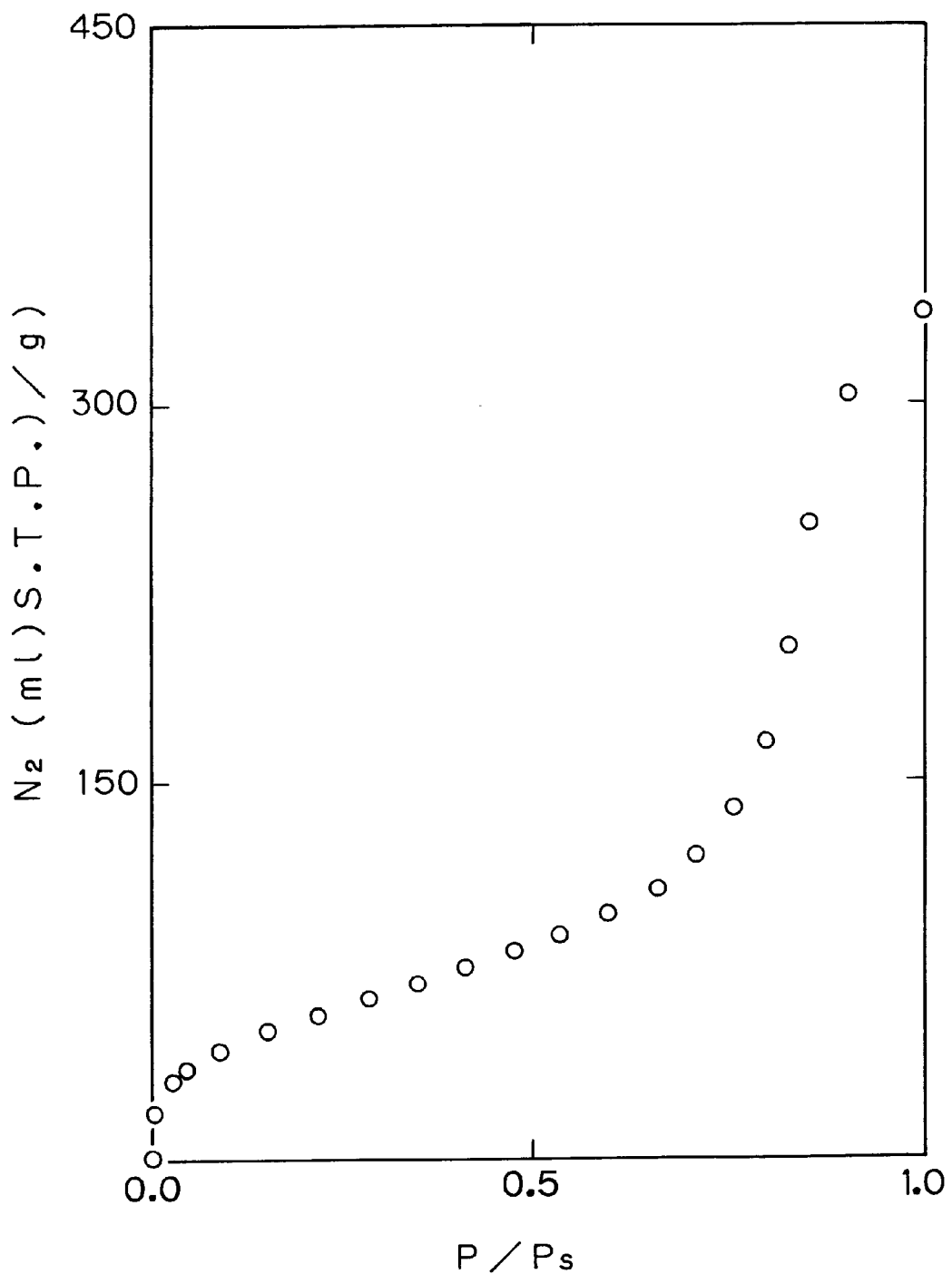
FIG. 1 is a nitrogen adsorption isotherm measured at liquid nitrogen temperature relative to the high-softening-point pitch obtained by the use of n-pantanol as the extraction solvent in Example 1.

In the specification of the present invention, the term "carbonaceous material" means a high-softening-point pitch, a stabilized material, carbonized or graphitized material produced by calcining this stabilized material in an inert atmosphere or an oxidizing gas atmosphere, and molded articles produced from any of these materials. The term "BTX solvent" or "BTX" means an aromatic solvent such as benzene, toluene, xylene, ethylbenzene, or a mixture thereof. Further, the term "minute pore" is used in usual meaning, the term "micropore" is used to indicate pore having a diameter of 20 Å or less, and the term "mesopore" is used to indicate a pore having a diameter of 20–500°. Still further, the term "molding" is used to cover a broad scope such as pelletizing, press molding, extrusion molding, granulating, and the like. The term "stabilized" and "stabilizing" are used as synonyms of "rendered infusible" and "rendering infusible".

The Starting Method

As the starting material of the present invention, it is necessary to use a heavy oil or pitch having a hydrogen/carbon (H/C) atomic ratio of from 0.8 to 1.2. When a material having an H/C atomic ratio of less than 0.8, i.e. a material rich in aromatic components and having very few aliphatic side chains, is used as the starting material, it is difficult to extract light components from the starting material, because the solubility of the starting material in an extracting organic solvent is relatively low. Thus, it is difficult to obtain pitch particles having sufficiently high-softening point. Still further, insufficient extraction of light components results insufficient formation of mesopores. That is, it is difficult to obtain high-softening-point pitch particles rich in mesopores having a sufficiently high pore volume. Further, if such a starting material is used, it is necessary to use a long period of time for stabilizing the material, i.e., micro-shaped material or molded article, in the fourth step described hereinafter, because the oxidation rate of the material is too low. For the same reason, it is difficult to stabilize the material, i.e. micro-shaped material or molded article, over throughout the material, i.e. not only the surface thereof but also the inner portion thereof, by the oxidation.

Contrary to the above, if a pitch having an H/C atomic ratio of higher than 1.2, i.e. poor in aromaticity and excessively rich in aliphaticity, is used as the starting material, recovery rate in the light components-extraction step described hereinafter, i.e. the second step of the present invention, will be too low. When the recovery rate becomes too low, there is a risk to destroy the shape of the micro-shaped materials prepared in the first step described hereinafter. Still further, in the steps for stabilizing the material described hereinafter, i.e. the fourth step of the present invention, the yield of the desired stabilized material will be decreased, because weight decrease by the oxidative decomposition of the material will proceed rapidly than the introduction of oxygen.

In the present invention, it is necessary to use, as the starting material, a heavy oil or pitch containing substantially no BTX insoluble components. That is to say, it is important that the starting material has a BTX insoluble content of less than 1 wt. % measured by usual method for determination of insoluble components, such as prescribed in the Japanese Industrial Standards (JIS). Because, if the starting material contains BTX insolubles, the insoluble components may interfere the production of micro-shaped materials in the form of particles, liquid particles, powder, fibers, etc. in the order of microns. Further, BTX insoluble components are the components formed by a thermal polymerization and the like, and having high molecular weights. A high-softening point pitch containing BTX insolubles inevitably has a wide molecular weight distribution which in turn results non-uniform reaction during the stabilization and carbonization steps hereinafter described.

As the raw material heavy oils usable in the present invention, many kinds of materials can be used and are illustrated below. As the raw materials of petroleum origin, heavy oils obtainable by naphtha cracking (usually called naphtha cracking tars or simply called naphtha tars), heavy oils obtainable by gas oil cracking (usually called pyrolysis tars), heavy oils obtainable by fluid catalytic cracking (FCC) of petroleum fractions (usually called decant oils or FCC slurry oils), and the like can be cited. Among of these naphtha cracking tar is especially suitable, because it contains almost no hetero atoms like sulfur, nitrogen, oxygen. This is because the raw material of naphtha cracking tar is naphtha consisting of almost pre hydrocarbons. The fact that naphtha cracking tar contains almost no hetero atoms is meritorious when the handling of the exhaust gases discharged during the carbonization step.

A heavy oil of coal origin like coal tar is unsuitable, as is, for use in the present invention, because the heavy oil of coal origin generally has a too low H/C atomic ratio, i.e. a high aromaticity, and usually contains a large amount of BTX insoluble components. However, even a heavy oil of coal origin, it can be used in the present invention, if it is subjected to a treatment to separate and remove the BTX insoluble components and/or a hydrogenation of hydrocracking treatment so as to satisfy the requirements mentioned before. Although, as stated above, a heavy oil of coal origin can be used in the present invention, the use of a heavy oil of coal origin is not suitable when compared to the use of a heavy oil of petroleum origin such as naphtha cracking tar, because it needs additional costs for the pretreatment or pretreatments.

As the raw material of the present invention, the heavy oils aforementioned per se can be used, or a low-softeningpoint pitch having a softening point measured by temperature gradient method of not higher than 150° C. can also be used.

The term "softening point measured by temperature gradient method" used herein can be determined as follows: The softening point was determined by heating a long and narrow aluminum plate with a temperature gradient along the length, placing the sample powders along the plate, brushing lightly off the samples and measuring the temperature of the spot where the samples begin to adhere. The apparatus used is a product of Asia Rikaki KK, AMK-B2CEFH-3. The softening point measured by temperature gradient method is approximately 15–20° C. lower than the softening point measured by JIS Ring and Ball (R & B) method and approximately 25–50° C. lower than the softening point measured by Mettler method specified in ASTM. Of course, the corelations mentioned above are helpful only to estimate R & B softening point or Mettler softening point and the differences between the softening point used in the present invention and R & B softening point or Mettler softening point can vary depending on the kind, origin, and properties of the pitches.

The First Step: Micro-shaping of the Starting Material

The first step of the present invention is a step for making micro-shaped materials, i.e. particles, liquid particles, powder, or fibers having sizes of not larger than 100 μm from the specified starting raw material aforementioned.

The reason for limiting the size as not larger than 100 μm is to accelerate and to shorten the time required for uniform separation and removal of light components from the raw material in the extraction step, i.e. the second step after described. For example, if the size of the raw material to be extracted is large in the order of millimeters, the extraction occurs rapidly at the surface of the material, a long time is required for extracting inner portion thereof. Accordingly, if the size of the raw material to be extracted is large, and when the extraction time used is insufficient, the extraction cannot be performed uniformly. Another reason is that when conducting the adsorption of an anionic surface active agent on the surface of mesopores formed in the high-softening-point pitch obtained by the extraction of the light components and when conducting exchange of cationic portion of anionic surface active agent with metal ions, if the size of micro-shaped material is large, it is difficult to conduct the exchange uniformly from the surface to the center of the micro-shaped material and, of course, it is necessary to use a long period of time. Still another reason for limiting the size of micro-shaped material is to stabilize the extracted material uniformly from the surface to the inner portion thereof in the stabilizing step, i.e. the fourth step of the present invention after described. If the material has a large size, though the surface of the material can be stabilized smoothly in a short period of time, the inner portion thereof cannot be stabilized in a short time, because the diffusion rate of oxygen in the material is not so high. If the inner portion of the material is insufficiently stabilized, i.e. kept at a unstabilized state even in the part, the material is often molten or fused together by heating conducted afterward.

Various methods, such as pulverization, spinning, emulsification, membrane emulsification or spraying can be used as a method for making micro-shaped materials.

(a) It is desirable that pulverization is carried out while cooling or mixing with a large quantity of air, because the starting material of the present invention has a softening point of less than 150° C. by the temperature gradient method and the micro-shaped materials may fuse to each other due to heat generated during pulverization. As a means for pulverization by mixing with a large quantity of air, a jet mill is known in the art.

(b) When the softening point measured by the temperature gradient method is insufficiently higher than room temperature, e.g. higher than 45° C., the micro-shaped materials may also be prepared by spinning. Because the starting material which is used in the present invention does not substantially contain components insoluble in a BTX solvent (benzene, toluene, xylene, ethylbenzene, or a mixture of these), the material can be easily melt-spun if heated to at a temperature high enough to lower the viscosity to a range of from several hundreds to several thousands poise. A long fiber manufacturing method for extruding the melted material from nozzles and drawing fine fibers, a centrifugal spinning method for making fine fibers from the pitch expelled from nozzles by centrifugal force, a melt blow method for producing fine fibers by the power of a high-speed gas flowing immediately under the nozzles, or a vortex method can be adopted as the method for spinning. A temperature about 50–70° C. higher than the softening point measured by the temperature gradient method of the raw material is preferably used as the spinning temperature. Specifically, a spinning temperature of 95–220° C. is preferably used for the low-softening-point pitch of the present invention which has a softening point by the temperature gradient method of 45–150° C. Because this temperature range is sufficiently lower than the temperature at which common organic materials are decomposed or denatured in an inert gas, the spinning operation can be carried out in a stable manner without a problem such as decomposition, denaturing, or coking which is encountered in a spinning method for the manufacture of pitch-based carbon fibers using a common high-softening-point pitch as raw material. When the softening point of the raw material measured by the temperature gradient method is relatively low, fibers may fuse to each other if the pitch fibers ejected from nozzles are not sufficiently cooled. In such a case, fusing among fibers can be avoided by feeding the pitch fibers ejected from the nozzles directly into the organic solvent which is used in the second step.

Further, when the raw material is a material having a softening point of lower than 45° C. or the material is a liquid at normal temperature, pulverizing methods or spinning methods cannot be used as methods for making micro-shaped materials, and, therefore, in such a case, micro-shaped materials are prepared by the following emulsion, membrane emulsion or spraying method.

(c) We have already proposed an emulsion method in U.S. Ser. No. 08/565,116 filed on Nov. 30, 1995, now U.S. Pat. No. 5,736,030. The method is as follows:

A process for manufacturing fine particles of pitch with a high softening point comprising, a first step of stirring a raw material heavy oil in the presence of a surface active agent and water by a stirring method which can provide a shearing force to produce an emulsion with fine spherical liquid particles with a particle size of 100 μm or less dispersed in water, wherein the raw material heavy oil is a liquid having a viscosity of 1,000 poise or less when stirred; a second step comprising causing the emulsion obtained in the first step to come in contact with an extracting organic solvent which can dissolve water and capable of leaving at least 10 wt. % of the raw material heavy oil as an insoluble portion to extract and remove light components and a diluting organic solvent, if the diluting organic solvent exists, from the fine spherical liquid particles of the raw material heavy oil in the emulsion, thereby converting fine liquid particles of the raw material heavy oil to fine solid particles of pitch with an increased softening point; and a third step comprising separating and recovering fine solid particles of pitch with an increased softening point by a solid-liquid separation means from the liquid mixture of the emulsion and the extracting organic solvent obtained in the second step.

(d) A recently developed membrane emulsification method can also be adopted in the process of the present invention. This method uses a glass or a ceramics having uniform pores of the order of micron as an emulsification membrane media. Water containing a surface active agent is circulated or stirred on one side of this emulsification membrane media as a dispersion medium, while a material to be dispersed, e.g. a heavy oil, a pitch, or a solution of pitch dissolved in or diluted by an organic solvent, is pressed out by the pressure difference between the opposite sides of the emulsification membrane media. Because the material to be dispersed passes through uniform pores of the emulsification membrane media when pressed out, this material is dispersed into water as liquid particles with a size proportioned to the size of the pore. Liquid particles with a sharp particle size distribution can be obtained in this manner.

A feature of methods (c) and (d) for making micro-shaped materials is converting the raw material heavy oil or pitch into an emulsion in water. The emulsified heavy oil or pitch is in a form of globular droplets due to its surface tension.

(e) Further, micro-shaped pitch materials used in the present invention can be prepared by a spraying method described below. It is apparent from the descriptions below that the first and the second steps of the present invention can be conducted simultaneously, at once, by the spraying method.

Heretofore, a spraying method is not successful to produce micro-particles usable in the present invention. That is, the method of injecting pitch together with a hot gas entails a difficulty in quenching the particles without aggromerating. Usually, agglomerated large particles result. The existence of large particles is undesirable in the present invention. There is a modification method to add inorganic powder during the quenching, however, it has a drawback that the product cannot be used in the present invention, because the presence of the inorganic powder is undesirable.

We have found that micro-shaped high-softening-point pitch rich in mesopores can be prepared by a specific spraying method. In the method, a raw material heavy oil or pitch which has been pretreated to adjust its viscosity to a suitable level is sprayed by a suitable spraying means to obtain a liquid oil particles having sizes of 100 $\mu$m or less. Then, the liquid oil particles thus prepared are immediately contacted with an extracting organic solvent to remove light components and diluents, if used in the pretreatment, contained in the liquid oil particles. Thus, micro-shaped high-softening-point pitch rich in mesopores which cannot form agglomerates even if they are contacted each other, can be produced. The shape of the particles is not limited and any shapes, e.g. plate, rod, sphere or even agglomerate, can be used in the present invention, if the sizes thereof are 100 $\mu$m or less. As the extracting organic solvent, the extracting organic solvent fully explained in the description relative to the second step can be used. The spraying operation can be carried out either in a gas phase or even in a liquid phase, i.e. in the extracting organic solvent. The contact of liquid oil particles with the extracting organic solvent can be carried out in any suitable manners, such as (i) dropping the liquid oil particles to the extracting organic solvent, (ii) contacting the liquid oil particles ejected from an ejecting nozzle with a spray of the extracting organic solvent ejected from other ejecting nozzle in a gas phase, or (iii) injecting the raw material heavy oil from an ejecting nozzle dipped in the extracting organic solvent.

The micro-shaped materials obtained by the use of operation (iii) can have many shapes, such as plates, rods, particles etc. by the operating conditions used, and the micro-shaped materials obtained by the use of operation (i) or (ii) are usually spherical or elliptic particles. And, therefore, when the production of spherical or elliptic particles is desired, the use of operation (i) or (ii) is preferred.

There are no specific limitations to the types of spraying devices which are used for spraying heavy oil inasmuch as such a device can produce oil particles with a size of 100 $\mu$m or less. For example, a rotating disk type device, a pressure nozzle type device, or a binary fluid nozzle type device can be used. The rotating disk type device is a device which supplies a raw material to a disk rotating at high speed and scatters the raw material by centrifugal force to produce liquid particles. Usually, the disk has a diameter of 10–35 cm and rotates at a rate of 3,000–20,000 rpm. The pressure nozzle type is a device for pressurizing the raw material and causing the raw material to be ejected from orifice of nozzles as liquid particles. Usually, the ejection pressure is about 20–700 Kg/cm$^2$·G and the orifice has a diameter of 0.3–5 mm. The binary fluid nozzle type device is a device which produces a spray of raw material using a jet of a gas according to the mechanism of a sprayer. Usually, the gas pressure is about 2–8 Kg/cm$^2$·G and the raw material pressure is about 1–5 Kg/cm$^2$·G.

Although any of these spraying devices may be used in the present invention, the rotating disk type and the binary fluid nozzle type, particularly the binary fluid nozzle type, are preferred when liquid droplets with a small particle diameter are desired. When the binary fluid nozzle type device is used, nitrogen, helium, argon, air, carbon dioxide, or the like are used either individually or as a mixture of two or more gases. Air or nitrogen gas is preferred in view of the cost and safety, with nitrogen being particularly preferred.

In order to produce fine oil particles with a particle size of 100 $\mu$m or less from a heavy oil using these spraying devices, it is necessary to maintain the heavy oil in liquid form. There is no limitation to the viscosity of the oil, inasmuch as the oil is liquid. In general, the oil is used at a viscosity of 20 poise or less, preferably 10 poise or less, according to the type, structure, and performance of the spraying device used.

A solid heavy oil may be heated or diluted with an organic solvent to liquefy it or to adjust the viscosity The spraying method has a merit because it does not need to use water in contrast with the emulsion method and membrane emulsification method aforementioned. Nonuse of water means that the treatment of waste water can be eliminated.

By any one of methods mentioned above, micro-shaped materials, i.e. particles, liquid particles, powder, or fibers having a size of not larger than 10 $\mu$m can easily be prepared. Incidentally, if the micro-shaped materials contain a large amount of very fine micro-shaped materials having the sizes of smaller than 0.1 $\mu$m, such materials are not so suitable for use in the present invention when considering the handling of the filtration step, the stabilizing step, and carbonization step mentioned hereinafter. Fortunately, the sizes of the micro-shaped materials obtainable by the methods mentioned above are usually larger than 0.1 $\mu$m.

In the above, it is stated as if method (c), (d), or (e) can only be applicable for a starting material having a softening point of lower than 45° C. or a heavy oil which is a liquid at normal temperatures, but it is apparent that even a pitch having a softening point of not lower than 45° C. can also be used in the method (c), (d), or (e) if the starting material is pretreated to adjust the softening point or viscosity to meet the requirement mentioned above.

When a low-softening-point pitch is selected as the raw material, it is used as a solution having a predetermined viscosity by dissolving it in a suitable solvent. In the emulsion method and the membrane emulsification method, it is preferable that the raw materials have a viscosity of not higher than 1,000 poise at the temperature of emulsification, and in spraying method, it is preferable that the raw materials have a viscosity of not higher than 20 poise at the temperature of spraying. Because the raw material used in the present invention contains no BTX insoluble components, as the organic solvent to be used for making a solution of the raw material, it is no need to say that BTX solvent is preferred. However, other solvents can also be used provided that they can dissolve more than 90 wt. % of the raw material. Examples of such organic solvents are carbon tetrachloride, chloroform, trichloroethylene, tar gas oil or carbonyl oil obtained from coal tar, and gasoline fraction or gas oil produced by naphtha cracking.

The Second Step: Extraction of Light Components

The second step of the present invention is a step for making micro-shaped high-softening-point pitch, i.e. particles, powder, fibers, having a sufficient pore volume due to the existence of huge number of mesopores which is necessary to conduct the adsorption of a surface active agent after described, having suitable properties for conducting stabilizing step, i.e. the fourth step, and having a weight loss by heating up to 300° C. of 5 wt. % or less. The oxidation of pitches obtained from cracked heavy oils of petroleum origin under the air atmosphere usually begins at a temperature of 140–160° C. Accordingly, if the material to be stabilized has a softening point of lower than 160° C., it is difficult to stabilize the material, because the material will melt or fuse together during the treatment for stabilizing. Accordingly, it is necessary that the material to be stabilized should have a softening point of sufficiently higher than 140–160° C. Therefore, the material to be stabilized should have a softening point of at least 150° C., preferably higher than 180° C., and more preferably higher than 200° C. Similarly, when a material showing a weight loss of greater than 5 wt. % by heating up to 300° C. is used as the starting material, the problem of melting or fusion is also occurred during the treatment for stabilizing the material. The use of such a material is not preferable also because such a material will evolve a large amount of volatile organic materials during the treatment. The evolution of a large amount of a volatile organic materials should be avoided from the view point of safety. Accordingly, it is necessary that the weight loss by heating up to 300° C. of the material to be stabilized should be kept below 5 wt. % and preferably below 3 wt. %.

To this end, in the second step, the light components are extracted out from the micro-shaped materials prepared in the first step by using an organic solvent. As the extracting solvent, it is necessary to use a solvent which can remain at least 10 wt. % of the micro-shaped materials as the insoluble portion, i.e. in a solid state. Stating another way, the extracting solvents should be those which can extract the light components partly, 90 wt. % at the maximum. When a solvent having higher dissolving ability than those specified above are used, the yield of the desired high-softening-point pitch is decreased and often results a destruction of the micro-shaped materials prepared in the first step, and, therefore, the use of an extracting solvent having such strong dissolving ability is not suitable.

As the organic solvent satisfying the requirements mentioned above, aliphatic hydrocarbons, ketones, and alcohols can be cited. As the aliphatic hydrocarbons, n-pentane, cyclopentane, n-hexane, isohexane, cyclohexane, n-heptane, isooctane, etc.; as the ketones, acetone, methyl ethyl ketone (MEK), diethyl ketone, methyl isopropyl ketone, methyl isobutyl ketone (MIBK), etc.; and as the alcohols, methanol, ethanol, n-propanol, isopropanol (IPA), n-butanol, sec-butanol (SBA), n-pentanol, n-hexanol, cyclohexanol, etc. can be cited. Each of these solvents can be used alone or they can be mixed to adjust the dissolving ability, if desired. Further, BTX solvent can be added to the solvent or solvents mentioned above if the mixed solvent satisfies the dissolving ability within the range prescribed above. By the use of such mixed solvent, the necessary amount of the solvent can be reduced, because the mixed solvent has a considerably high dissolving ability.

When the micro-shaped material is a solid material, e.g. solid particles, powder, or fibers prepared by pulverizing or melt spinning method, in general, to obtain a material having softening point measured by temperature gradient method of 150° C. or higher, it is sufficient to remove 20–90 wt. %, preferably 35–90 wt. %, of light components from the micro-shaped material by extraction. However, when the micro-shaped material is liquid, e.g. liquid particles obtained by emulsion, membrane emulsification or spraying method to obtain a material having a softening point measured by temperature gradient method of 150° C. or higher, it is necessary, in general, to remove about 50–90 wt. % of light components from the micro-shaped material by extraction.

Incidentally, if the first step is conducted by an emulsion method, or a membrane emulsification method, the use of a solvent mutually insoluble with water, such as an aliphatic hydrocarbon, alone is not preferable, because a solvent mutually insoluble with water causes to form a scum-like material when mixed with an aqueous emulsion. The scum-like material is difficult to separate by filtration of centrifugation. Accordingly, in such a case, the use of alcohols or ketones which are mutually soluble with water is preferable. A mixture of aliphatic hydrocarbons and additional alcohols or ketones can be used similarly when the mixture is mutually soluble with water.

The process of extracting the light components is not limited and any known processes can be used. In the process of the present invention, because the raw material has been shaped as micro-shaped materials having the size of not larger than 100 µm, the extraction can be rapidly completed, for example, mixing the micro-shaped materials with an extracting organic solvent and then recovering insoluble materials by filtration or centrifugation. Incidentally, the extracting operation is not limited to once, and extracting and separating operations can be conducted repeatedly.

When a solvent having a relatively high boiling point is used as the extracting solvent, a long time is required for removing the solvent or drying of the micro-shaped high-softening-point pitch materials. In such a case, it is preferable to use, for example, the following procedure. That is, firstly, the extracting solvent used is removed well by filtration or the like from the micro-shaped high-softening-point pitch materials; secondly, the micro-shaped high-softening-point pitch materials are washed with a solvent having a lower dissolving ability and a lower boiling point than the extracting solvent used, so as to remove the high boiling point extracting solvent; and thirdly, the micro-shaped materials are dried.

When conducting the washing treatment or treatments, light components contained in the micro-shaped materials are further extracted depending on the dissolving ability of the low boiling point solvent used.

When conducting the extraction treatment, the amount of the extracting solvent is arbitrarily selected from a range of from several times to several ten times of the material to be treated, i.e. the micro-shaped material, in weight basis. If the amount of the extracting solvent used is small, the pitch material cannot have a sufficiently high softening point even after the treatment, because a limited amount of light components can only be extracted out. Further, when the micro-shaped materials having excessively small particle sizes, i.e. smaller than 0.1 μm, are treated, and a small amount of extracting solvent is used, the mixture of the materials and solvent has a poor fluidity, and, therefore, it will be difficult to conduct the extracting operation smoothly. Accordingly, it is preferable to use 3–30 times amounts of an extracting solvent. The extraction can be proceeded well at room temperature, but to increase the dissolving ability of the solvent, it is possible to use higher temperatures. The extraction time is not limited, and in usual cases, the extraction treatment will be completed sufficiently within several hours.

As the extracting conditions obtaining micro-shaped high-softening-point pitch rich in mesopores (pore diameter of 20–500Å) having pore volume of more than 100 mm³/g calculated from a nitrogen adsorpiton isotherm measured at the liquid nitrogen temperature by Dollimore-Heal method (DH method), as stated above, it is sufficient if 20–90 wt. %, preferably 35–90 wt. % of light components are removed by the extraction from the micro-shaped materials, if the micro-shaped material is solid, and if the micro-shaped material is liquid, e.g. liquid particles, it is necessary, in general, to remove about 50–90 wt. % of light components from the material. As stated before, the formation of a sufficient amount of mesopores is indispensable for achieving the object of the present invention, i.e. the production of carbonaceous materials carrying ultrafinely dispersed metals. It is to be noted that pore volume is not increased parallel to extraction times, and, therefore, mere repetition of extractions cannot afford a substantial increase of pore volume. There is an appropriate extraction times for giving the maximum pore volume, even if the same solvent is used in the same amount. Similarly, even if an extraction solvent having high dissolving ability is used, it does not mean automatically that by the use of such a solvent, a large pore volume can be obtained. There is an appropriate dissolving ability for giving the maximum pore volume. Because the degree of mesopore formation, i.e. the volume occupied with mesopores, governs the adsorption amount of an anionic surface active agent which in turn affects the exchange rate of cationic portion of anionic surface active agent with metal ions conducted in a latter stage or stages of the present invention hereinafter described, it is advisable, prior to conduct commercial operation, to conduct small scale tests so as to determine efficient and appropriate conditions for forming mesopores, e.g. combinations of kind and amount of extracting solvent, times of extraction, method of washing and method of drying.

By the process described above, micro-shaped high-softening-point pitch materials having a softening point measured by the temperature gradient method of higher than 150° C., preferably higher than 180° C., more preferably higher than 200° C., showing weight loss by heating up to 300° C. of 5 wt. % or less, preferably 3 wt. % or less, and being rich in mesopores having pore diameter of 20–500Å, i.e. having pore volume of 100 mm³/g or greater calculated from nitrogen adsorption isotherm at liquid nitrogen temperature by DH method can easily be prepared.

The high-softening-point pitch obtained by this extraction operation has been experimentally confirmed to have a specific surface area (SA(BET), m²/g) and a DH method pore volume (mm³/g) approximately satisfying the following correlation.

Pore volume (DH method, mm³/g)=Specific surface area (SA(BET), m²/g)×(2.0–2.3)

wherein the specific surface area is determined by the BET 1 point method according to the ASTM method (Draft Proposal 7-18-76, Revision 24-6-81) using a direct reading surface area measuring apparatus, MONOSORB, tradename, (S-B type, manufactured by QUANTACHROME Co.) and the pure volume is measured by the DH method from the adsorption isotherm at the liquid nitrogen temperature, which is measured using an adsorption isotherm measuring instrument BELSORP-28SA, tradename (manufactured by Japan Bell Co., Ltd.).

Accordingly, an approximate value for the pore volume of the high-softening-point pitch obtained can be determined by measuring the specific surface area according to the simple BET 1 point method. The value for the BET 1 point specific surface area satisfying a pore volume by the DH method of 100 m³/g or greater is more than 44 m²/g according to the above formula, indicating that a specific surface area of 50 m²/g or greater is sufficient.

The Third Step: Causing Metal to be carried on

To cause a metal to be carried on the high-softening-point pitch with mesopores, the high-softening-point pitch is first caused to come into contact with an anionic surface active agent, thereby obtaining a high-softening-point pitch with an anionic surface active agent adsorbed thereon. This high-softening-point pitch with an adsorbed anionic surface active agent is then caused to come into contact with an aqueous solution of a metal salt to replace the cation of the anionic surface active agent with the metal ion.

Given as examples of the anionic surface active agents are salts of fatty acids, alkyl sulfates, alkyl benzene sulfonates, alkyl naphthalene sulfonates, salts of dialkyl sulfosuccinates, salts of alkyl phosphates, alkyl ether sulfates, formalin condensates of naphthalene sulfonic acid, and salts of alkyl ether phosphates.

Although cationic surface active agents, nonionic surface active agents, and water-soluble polymers are known as surface active agents beside the above-mentioned anionic surface active agents, these cannot cause, or cause only insufficiently, the replacement of a metal ion after the adsorption treatment. Therefore, adsorption of an anionic surface active agent is essential when replacement with a metal ion (i.e. a cation) is intended afterward such as in the case of the present invention.

The anionic surface active agent can be caused to be adsorbed on the high-softening-point pitch by simply adding the high-softening-point pitch to an aqueous solution of the anionic surface active agent and sufficiently contacting the mixture by stirring or the like. The completion of adsorption can be judged by allowing the mixture to stand and confirming that all the high-softening-point pitch has been precipitated. This is because the apparent specific gravity of the high-softening-point pitch having mesopores calculated from the true density (about 1.15 g/cm³) and the pore volume is less than 1.0, usually about 0.7, whereas the apparent specific gravity of the same high-softening-point pitch after an anionic surface active agent has been completely adsorbed is 1 or greater.

Although the time required for adsorption varies according to the concentration of anionic surface active agent, the method for agitation, and the like, a time of several hours or less, usually one hour or less, is sufficient. There is no specific limitation relative to the temperature to be used provided that the temperature is not higher than the softening point of the high-softening-point pitch to be treated.

The amount of an anionic surface active agent to be used depends to the pore volume of the high-softening-point pitch. An amount of about 30 wt. % of the high-softening-point pitch is sufficient in the present invention. The use of the surface active agent in an amount of little greater than the amount adsorbable by the high-softening-point pitch is desirable. In this instance, the filtrate obtained after separation of the high-softening-point pitch after adsorption of the surface active agent by filtration or the like contains an excess amount of the surface active agent. If this filtrate is recycled, the surface active agent remaining in the filtrate can be adsorbed by fresh high-softening-point pitch, so that no surface active agent is wasted. Although the concentration of the anionic surface active gent in aqueous solution has almost no influence on the amount of surface active agent adsorbed on the high-softening-point pitch, too great an amount of water increases the total amount processed, whereas too small an amount makes blending difficult and may cause operational problems. The concentration of the anionic surface active agent in the aqueous solution is about 0.1 to 10 wt. %, and preferably 0.5 to 5 wt. %.

After adsorption of the anionic surface active agent, the high-softening-point pitch is separated from the aqueous solution by filtration, centrifugation, or decantation, and dried, as required.

Next, the high-softening-point pitch in which an anionic surface active agent has been adsorbed is caused to come into contact with an aqueous solution of a metal salt, whereby the cation in the surface active agent is replaced by the metal ion.

There are no limitations to the metal salt used here inasmuch as such a metal salt can be dissolved in water and produces a metal ion. For example, a nitrate, sulfate, chloride, or acetate can be suitably used. There are no limitations to the metal. Calcium, barium, cobalt, manganese, iron, nickel, copper, silver, and the like can be suitably selected according to the application of the carbonaceous material, and used as the above described metal salt.

To cause the high-softening-point pitch on which anionic surface active agent has been adsorbed to come into contact with a metal salt, after causing the high-softening-point pitch to adsorb an aqueous solution of a surface active agent, the metal salt is directly added to the mixture of the pitch and the solution, or an aqueous solution of the metal salt previously prepared may be added to the mixture. Alternatively, the high-softening-point pitch on which a surface active agent has been adsorbed is separated from the solution by filtration or the like, and the separated material may be added to an aqueous solution of the metal salt which has previously been prepared. In this instance, the concentration of the metal salt in the aqueous solution, in terms of the concentration of metal ion, is preferably in the range of 0.01–1 wt. %. There is no need for the concentration to be excessively large. The period of time required for the replacement by the metal ion is several hours at most. Usually, a period of less than one hour is sufficient. After replacement with metal, the solid, i.e. high-softening-point pitch carrying metal is separated from liquid by conventional filtration, centrifugation, decantation and the like, and washed with water which does not contain a metal ion, and dried at a temperature lower than the softening point of the high-softening-point pitch.

The amount of metal replacing cation by this operation is about 5 wt. % or less, usually about 3 wt. % or less, of the high-softening-point pitch, although the specific amount varies according to the amount of the anionic surface active agent adsorbed on the high-softening-point pitch, the valence of the metal, and the atomic weight of the metal. Because the dispersion of the metal is fine and uniform, even though the amount of metal is small, the dispersion greatly affect subsequent operations of stabilization, carbonization, and graphitization, and the quality of the resulting carbonaceous material.

The high-softening-point pitch with a metal carried thereon thus prepared can be converted into a new type of carbonaceous material by the treatment such as stabilization, carbonization, and graphitization which are hereinafter discussed. Because this high-softening-point pitch can be molded and sintered itself, this material can be used as a binder for manufacturing molded articles which are formed of homogeneous carbon, as later discussed. Furthermore, this high-softening-point pitch can be used as a binder for other carbon materials and as a material for producing composite material for ceramics and other carbon materials.

The Fourth Step: Stabilization

The high-softening-point pitch with a metal carried thereon is then heated in an atmosphere including oxygen to stabilize. The stabilization treatment should be sufficient to prevent fusion or adhesion in the subsequent steps of carbonization and graphitization.

The high-softening-point pitch obtained by the process of the present invention does not contain components insoluble in BTX solvent as is. However, when this pitch is gradually heated in an atmosphere containing oxygen, e.g. in the air, the weight increases by oxidation from temperatures of about 140–160° C. BTX solvent insoluble components and quinoline insoluble components are gradually produced along with the weight increase. In this instance, a high-softening-point pitch in which the BTX solvent insoluble components reach 100 wt. % but the quinoline insoluble components do not yet reach 100 wt. % may be fused or become molten during the subsequent treatment involving heating, and further may cause problems such as deformation of molded articles. According to the knowledge of us, the point of stabilization where the resulting pitch produces no fusion or adhesion in the subsequent calcining step and the point where the quinoline insoluble components reach 100 wt. % almost coincide. Specifically, the minimum conditions required for the stabilization to prevent fusion and adhesion almost correspond at this point, where the yield after carbonization is also highest (these conditions are hereinafter called optimum stabilization conditions). Accordingly, the stabilization here should be carried out under conditions severer than the optimum stabilization conditions (these conditions are hereinafter called over stabilization conditions).

There are no specific limitations to the stabilization method inasmuch as this method allows the high-softening-point pitch to be heated under an atmosphere including oxygen so that the oxygen can be absorbed by the pitch. The treating conditions differ according to the oxygen concentration in the atmosphere. For example, when the treatment is carried out in an atmosphere of air, the temperature is raised at a rate of 0.1–10° C./min and the pitch is kept at 200–400° C. for about 0.1–10 hours.

A high-softening-point pitch with a metal carried thereon manifestly exhibits an oxidation promotion effect during stabilization as compared with a high-softening-point pitch with no metal carried thereon. Depending on the kind of the metal, the pitch is suddenly burned at a certain temperature, leaving almost no stabilized material after burning. Therefore, adequate care should be taken to avoid occurrence of such burning.

The oxygen in the stabilized material is not yet saturated when treated by the above-mentioned optimum stabilization conditions. If further heated above the optimum stabilization conditions, the oxygen concentration in the stabilized material gradually increases, reaches saturation, and becomes almost constant beyond certain conditions, even though the recovery rate after stabilization gradually decreases. As discussed later, these over stabilization conditions are preferable when more efficient formation of minute pores in the carbonaceous material is desired.

The stabilized material thus obtained is unique as a carbonaceous material homogeneously carrying a metal and can be used as is, or as a component for making a composite material combined with other materials.

In addition, it is possible to obtain a molded article of carbonaceous material carrying a metal using this stabilized material as a filler and using the high-softening-point pitch obtained in the second step of the present invention or the high-softening-point pitch on which a metal has been carried obtained in the third step of the present invention as a binder. In this instance, if the high-softening-point pitch on which a metal has been carried is used as a binder, a molded article of carbonaceous material formed of homogeneous carbon both in the filler part and the binder part can be obtained.

This molded article can be manufactured by a process almost the same as the process for manufacturing a molded article of carbonaceous material which carried no metal thereof, discussed by us in U.S. Ser. No. 08/749,932 filed on Nov. 14, 1996, now abandoned. Specifically, the process for making molded articles by the process of this invention comprises using a stabilized material with a metal carried thereon as a filler and a high-softening-point pitch with or without a metal carried thereon as a binder, mixing these in a proportion such that the amount of the binder for the total weight of the filler and the binder is 20–70 wt. %, kneading the mixture, pulverizing as occasion calls, and molding it into molded articles, each having the shortest distance from the center to the outside surface of 5 mm or less. These molded articles are stabilized with both the filler part and the binder part stabilized. If carbonization or graphitization of these molded articles is necessary, they are processed by heating in the same manner as described in the next step, i.e. the fifth step.

The Fifth Step: Calcining of the Stabilized Material

To obtain a carbonized material or a graphitized material, the above-mentioned stabilized material is calcined in an inert atmosphere or an oxidizing gas atmosphere. Here, carbonization means a heat treatment at a temperature of 2,000° C. or below and usually 1,500° C. or below. The treatment at temperatures above 2,000° C. is called graphitization.

The carbonization is carried out at a temperature of 500–2,000° C., preferably 500–1,500° C., for 10 minutes to several hours in an inert atmosphere such as nitrogen, argon, or helium, or at a temperature of 500–1,500° C., preferably 600–1,000° C., for 10 minutes to several hours when an oxidizing gas atmosphere containing at least one of carbon dioxide gas or steam is used. The carbonization in an oxidizing gas atmosphere is carried out for the purpose of forming minute pores with a large specific surface area by activation of a carbonized material. Any known oxidizing gas may be used for this purpose, with carbon dioxide gas and steam being particularly preferred in view of ease in handling and simplicity of exhaust gas processing.

When the carbonization is carried out at a temperature in the range of 600–800° C. or, in the case where over-stabilization conditions were applied to the stabilization treatment to sufficiently absorb oxygen, at a temperature in the range of 500–1,100° C. (or 600–1,000° C. in an oxidizing gas atmosphere), almost all stabilized material is converted into carbonized material with uniform minute pores. Accordingly, these conditions should be used when formation of minute pores is required according to the intended application of the products.

Moreover, in this carbonization treatment the rate of activation reaction, the amount of pores produced, minute pore diameter, minute pore distribution, specific surface area, and the like markedly differ according to the kind of metal which has been carried on. Influence of metal on the activation reaction behavior is clearly seen. For instance, in the case of stabilized material without a metal carried thereon the rate of oxidation reaction is slow at a temperature of 800° C. in a carbon dioxide gas atmosphere, and a long time (e.g. several hours) is required to obtain a large specific surface area. On the other hand, when a stabilized material with calcium carried thereon is carbonized, the oxidation reaction is so fast that almost no carbonaceous material is left if the reaction is carried out under the same oxidation conditions, and a carbonaceous material containing mesopores with a size in the range of 20–500Å can be obtained by employing more mild conditions of 700° C. and a reaction time of about 40 minutes.

In this manner, carbonaceous materials with various types of pores or without pores can be obtained by the process of the present invention by selecting carbonization treatment conditions such as the kind of metal, stabilization conditions, carbonization conditions, and the like. Accordingly, the present invention provides a porosity control method which has been sought for causing carbonaceous materials to exhibit new functions.

The graphitization treatment which follows the carbonization treatment is carried out by calcining the carbonized material at a temperature of 2,000–3,000° C. in an inert gas atmosphere, such as nitrogen, argon, or helium.

In this graphitization treatment, the crystal structure of the carbonaceous material greatly changes due to the catalytic action of the metal carried thereon. The change in the crystal structure of carbonaceous material can be determined, for example, by X-ray diffraction. In the case of a carbonaceous material obtained by the stabilization of a high-softening-point pitch which does not carry a metal, followed by carbonization and graphitization in an inert atmosphere, examination of the (002) diffraction pattern by X-rays revealed a complex structure which contains a very broad diffraction with an angle of diffraction of 26° and a small peak of an ideal graphite structure in the vicinity of 26.5°, indicating that almost all structures have low crystallinity and only part of the material structures has a developed graphite structure. For instance, material produced from a raw material with manganese carried thereon by stabilization, carbonization, and graphitization has an extremely large diffraction in the vicinity of 26°, clearly indicating that the material has been altered to a highly crystalline structure.

The method for intentionally altering the crystal structure of the resulting graphitized products in this manner is also an important technique for causing materials to exhibit new functions. Thus the process of the present invention provides a means for controlling crystal structure.

As described above, a high-softening-point pitch having mesopores and a carbonaceous material with a metal carried thereon can be easily and efficiently manufactured by the process of the present invention.

A novel high-softening-point pitch having mesopores can be manufactured by a simple process according to the present invention from an inexpensive starting material, such as heavy oil or a low-softening-point pitch obtained from the heavy oil. Moreover, a carbonaceous material for exhibiting new functions can be industrially manufactured by a simple and efficient manner by causing a metal to be carried on this high-softening-point pitch.

Furthermore, because a softening-point pitch having mesopores which is produced by first micro-shaping the starting raw material and extracting with a solvent under specific conditions is used as the material, there are no economic or technical problems otherwise encountered by conventional processes for manufacturing high-softening-point pitches. In addition, a carbonaceous material with a metal homogeneously dispersed throughout can be obtained without using an oxidizing agent such as nitric acid. Moreover, it is possible to control pore size and crystal structure of carbonaceous material by appropriately selecting treating conditions, types of metal, and the like.

DESCRIPTION OF THE PREFERRED EMBODIMENTS

The present invention will now be explained in detail with reference to the following examples which are in no way limitative of the scope of the present invention.

In the following, "%" means "weight %" if not specified to the contrary.

Example 1

A low-softening-point pitch having a softening point of 71° C., measured by the temperature gradient method, was prepared by vacuum distillation of heavy oil (H/C atomic ratio: 0.94) which is a by-product of naphtha cracking to manufacture olefine (naphtha cracking tar). The yield of this pitch based on the naphtha cracking tar was 73%. The pitch had a xylene insoluble content of 0%, a quinoline insoluble content of 0%, a heating weight loss of 17.9% when heated to 300° C., measured by a thermobalance, and an elementary analysis of C: 92.9%, H: 7.0%, S: 0.02%, and an H/C atomic ratio of 0.90.

This pitch was charged into a melt spinning apparatus equipped with nozzles with a diameter (D) of 0.25 mm and a length (L) of 0.75 mm (L/D ratio=3), and spun at a temperature of 135° C. and a discharge pressure of 5 Kg/cm$^2$.G, then withdrawn by an air suction apparatus installed under the nozzles, to obtain fibers of a low-softening-point pitch with a fiber diameter of 20 μm.

Two grams of fiber of this low-softening-point pitch was put into 50 ml of various kinds of solvents shown in Table 1, and the mixture was stirred for one hour by a magnetic stirrer. This mixture was then filtered through a G-4 glass filter. The resulting insoluble components were put into 50 ml of a fresh solvent and stirred again for one hour. The mixture was filtered through the same glass filter and the residue was washed three times with methanol. Incidentally, in the case of n-pentanol was used as the solvent, washings with methanol were omitted. A solid product was obtained and put into a vacuum drier, then dried for 5 hours at 30° C., to obtain a high-softening-point pitch from which light components have been removed.

This high-softening-point pitch was observed using a scanning electrode microscope (SEM) to confirm that this was a fibrous powder cut into short fibers of several tens μm in length but having a fiber diameter almost the same as before the extraction.

Concerning with the fiberous powders, yield based on the low-softening-point pitch, softening point measured by temperature gradient method, and the specific surface area measured by the BET 1 point method (SA(BET)) from the amount of nitrogen adsorbed at the liquid nitrogen temperature, according to the ASTM standard (Draft Proposal 7-18-76, Revision 2 4-6-8) using a direct reading type surface area measuring instrument, MONOSORB, tradename, type: MS-8 (manufactured by the QUANTACHROME Company) are shown in Table 1.

Incidentally, the properties of high-softening-point pitch obtained by using n-pentanol as an extracting solvent are as follows: xylene insolubles: 0%, quinoline insoluble: 0%, heating weight loss of up to 300° C.: 2.1%, elementary analysis: C 92.8% H: 7.1%, S 0.03%, and H/C atomic ratio: 0.91.

Figure 2:
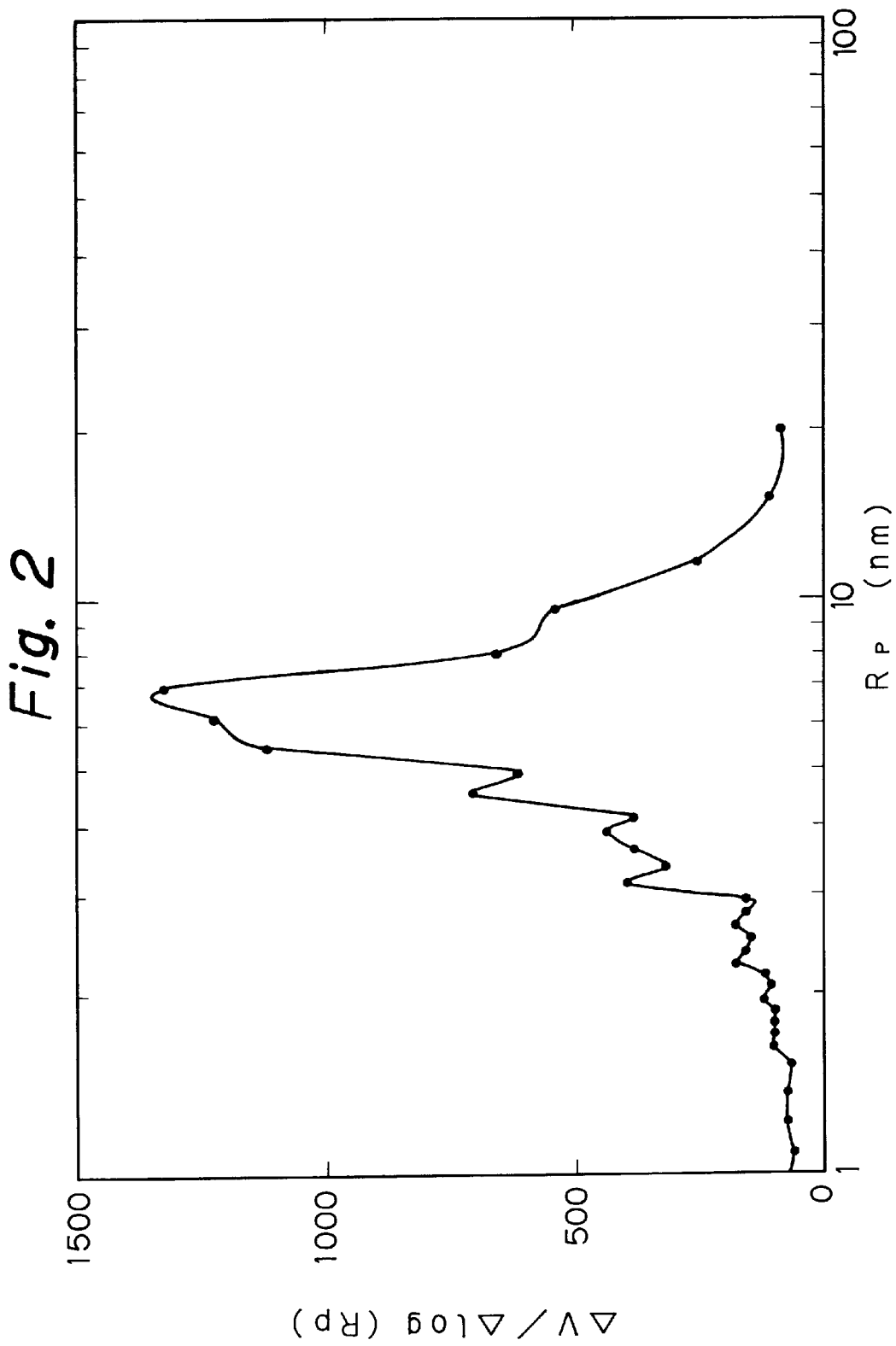
FIG. 2 is a minute pore distribution curve calculated from the result shown in FIG. 1 by Dollimore-Heal method.
Figure 3:
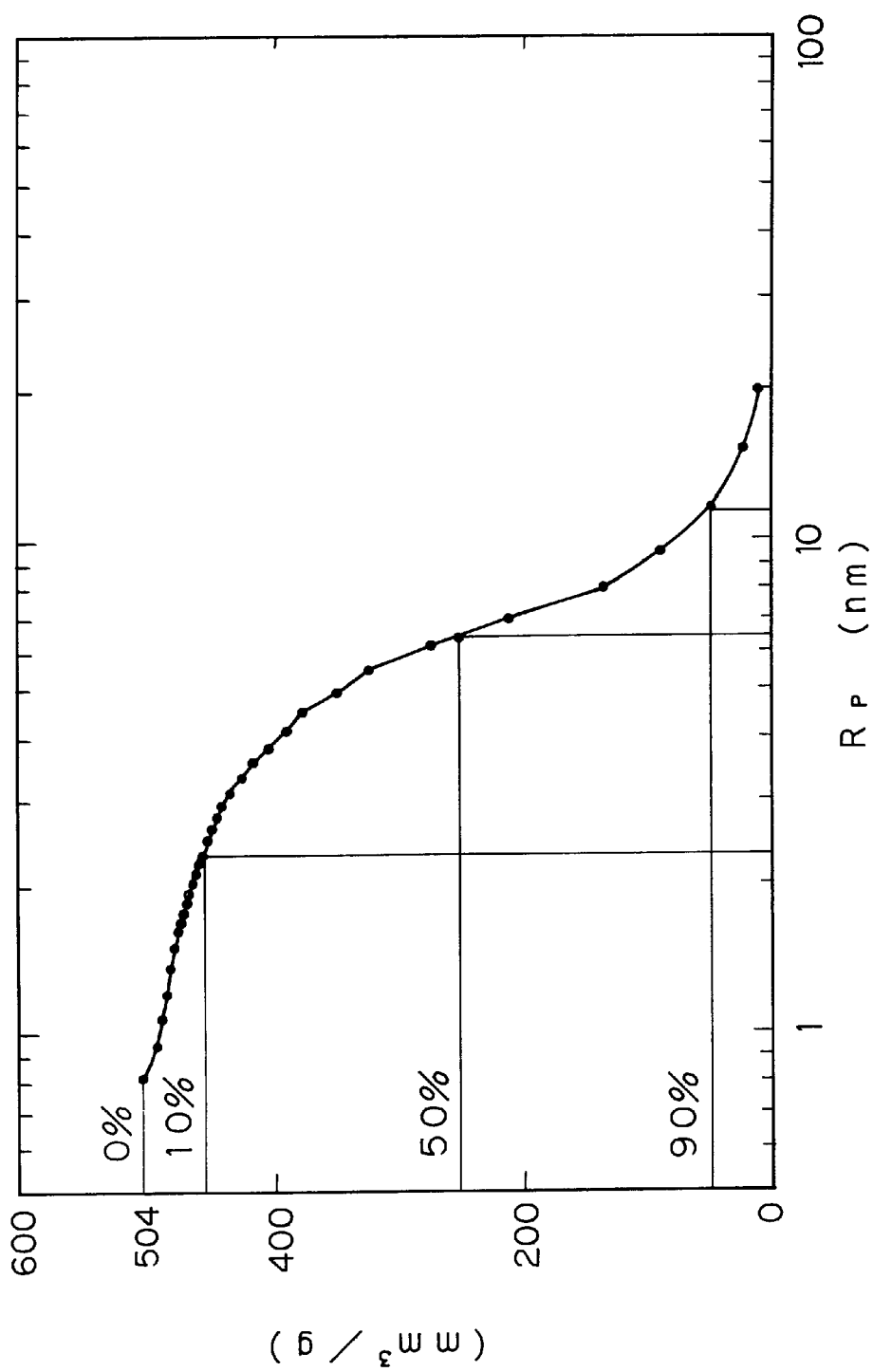
FIG. 3 is an integral curve of minute pore volume calculated from the result shown in FIG. 1 by Dollimore-Heal method.

Relative to the material obtained by the use on n-pentanol, a nitrogen adsorption isotherm was measured at liquid nitrogen temperature by using adsorption isotherm measuring instrument, BELSORP, tradename, type: 28SA (manufactured by Japan Bell Co.) and the result is shown in FIG. 1. In FIG. 1, the horizontal axis indicates relative pressure (P/Ps) at the measuring condition, wherein P means adsorption equilibrium pressure of nitrogen at the measuring temperature (liquid nitrogen temperature, 77° K), and Ps means the saturated vapor pressure of nitrogen at the measuring temperature, and the vertical axis indicates the volume of nitrogen adsorbed at the liquid nitrogen temperature (ml/g converted into standard temperature and pressure). FIG. 2 is a minute pore distribution curve calculated from the result shown in FIG. 1 by DH method, wherein the horizontal axis indicates radius of minute pores (Rp) in nm (diameter of the minute pores can be calculated by multiplying the value with a numeral of 20) and the vertical axis indicates the differential of minute pore volume (ΔV/Δlog (Rp)). FIG. 3 is an integral curve of minute pore volume by DH method, wherein the horizontal axis indicates radium of minute pores (Rp) in nm and the vertical axis indicates an integral of pore volumes (mm$^3$/g). It can be understood from FIG. 2, high softening-point pitch fibers obtained by using n-pentanol contain huge number of mesopores with radius of 2–20 n, (diameter of 40–400Å) of which central pore radius being 6–7 nm (diameter: 120–140Å). It can also understood from FIG. 3, the volume of minute pores existed in the pitch fibers mentioned just above is 504 mm$^3$/g. Concerning with high-softening-point pitch fibers obtained by the use of other solvents, minute pore volumes calculated in the same manner as described above are also given in Table 1.

TABLE 1

| Solvent | Pitch Yield[1] wt. % | Softening Point ° C. | Specific Surface Area SA (BET), m$^2$/g | Pore Volume mm$^3$/g |
|---|---|---|---|---|
| n-propanol | 72 | 152 | 57 | 118 |
| n-butanol | 57 | 206 | 217 | 435 |
| n-pentanol | 50 | 232 | 225 | 504 |
| n-hexanol | 47 | 237 | 213 | 482 |
| Mixed solvent[2] | 38 | 245 | 216 | 454 |

TABLE 1-continued

| Solvent | Pitch Yield[1] wt. % | Softening Point °C. | Specific Surface Area SA (BET), m²/g | Pore Volume mm³/g |
|---|---|---|---|---|
| Mixed solvent[3] | 30 | 262 | 151 | 317 |

[1]Yield of high-softening-point pitch based on the starting material, i.e. low-softening-point pitch.
[2]Composition: n-hexanol/acetone = 90/10 (vol/vol)
[3]Composition: n-hexanol/acetone = 70/30 (vol/vol)

From the table, it can be recognized that high-softening-point pitch rich in mesopores with a softening point of higher than 150° C. measured by temperature gradient method and having minute pore volume of larger than 100 mm³/g is obtained, if more than about 20 wt. % of light components are removed by extraction with the aid of an organic solvent from the starting raw material, i.e. low-softening-point pitch, in accordance with the present invention. Incidentally, between the specific surface area (SA (BET)) and minute pore volume (DH method) of the high-softening-point pitch thus obtained, following correlation can be found through the results of many experiments:

Pore volume (DH method, mm³/g)=Specific surface area (SA(BET), m²/g)×(2.0–2.3)

In the followings, the formula shown above is referred to an empirical formula.

Example 2

A low-softening-point pitch (H/C atomic ratio: 0.90) having a softening point of 49° C. measured by the temperature gradient method was obtained by the distillation of the naphtha cracking tar (H/C atomic ratio: 0.94) used in Example 1. A solution of the low-softening-point pitch was prepared by adding 30 weight parts of xylene to 70 weight parts of the low-softening-point pitch. A so called O/W-type emulsion containing, in a dispersed form, 11 vol. % of the low-softening-point pitch solution was prepared by sing 2% aqueous solution of a nonionic surface active agent, i.e. polyoxyethylene nonyl phenyl ether (Emulgen 985, tradename (Kao Corp.)) as a dispersant and by using a membrane-type dispersing test apparatus made by Ise Kagaku Co., Ltd. installed with a 4 μm-microporous glass as a dispersing media. That is, the emulsion was prepared by extruding the pitch solution through the microporous glass to the dispersant.

Then, the emulsion was dropped gradually into 10 times amounts of SBA under agitation to extract out the xylenes used for dissolution and the soluble components contained in the low-softening-point pitch. The mixture, i.e. the suspension thus obtained, was centrifuged to separate solid material, and the solid material was washed with methanol and dried at 60° C. under a reduced pressure. The yield of the material thus obtained based on the low-softening-point pitch, i.e. starting raw material, was 53%.

Further, the solid material was agitated in a 20 times amount of n-pentanol and then filtered. The filter cake was washed with methanol and then dried. Thus, micro-spherical particles of a high-softening-point pitch were obtained. The yield of the micro-spherical particles based on the low-softening-point pitch, i.e. starting raw material, was 48%.

The high-softening-point pitch obtained by forming micro-shaped material through a membrane emulsification method and by extracting light components from the micro-shaped material had average particle diameter of 16 μm and had following properties: Softening point measured by temperature gradient method: 243° C.; xylene insolubles: 0%; quinoline insolubles: 0%; weight loss by heating up to 300° C: 1.7%; elementary analysis C: 92.7%, H: 7.1%, S: 0.02%; H/C atomic ratio: 0.92; specific surface area by BET 1 point method: 187 m²/g The pore volume calculated from the specific surface area by the empirical formula above is 374–430 mm³/g.

Example 3

One hundred grams of the naphtha cracking tar (H/C atomic ratio: 0.94) used in Example 1 was heated to 80° C. and stirred in a homogenizer (POLYTORON, tradename, manufactured by KINEMATICA Company, Switzerland) at a rotation of 5,000 rpm, while adding 10 g of a nonionic surface active agent (polyoxyethylene nonyl phenyl ether, Emulgen 985, tradename, manufactured by Kao Corp.). After sufficient stirring, 300 ml of ion exchange water was gradually added to obtain an emulsion with a yellow color in which the naphtha cracking tar was dispersed as fine particles.

This emulsion and a mixed solvent of SBA and MEK (80:20 by volume) were continuously added dropwise to a vessel equipped with a stirrer using separate pumps at a ratio of 1:10 by volume and mixed to extract light components in the raw material and water from the emulsion. The mixture was centrifuged to recover deposited insoluble components, which were again extracted by using 10 times volume of a mixed solvent of SBA and MEK. The same operation was repeated three times using methanol to wash the solid components.

The resulting solid substance was dried under a reduced pressure of 60° C. to obtain globular particles of a high-softening-point pitch with a softening point of 242° C. measured by the temperature gradient method, an average particle diameter of about 3 μ, and specific surface area by BET 1 point method of 152 m²/g. Yield of the high-softening-point pitch based on the starting raw material, i.e. naphtha cracking tar, was 25%. Incidentally, the pore volume calculated from the specific surface area by the empirical formula is 304–350 mm³/g.

Example 4

A naphtha cracking tar with a weight loss by heating up to 300° C. of 59.5% measured in a thermobalance, a viscosity of 1.8 poise at 30° C., a xylene insoluble content of 0%, a quinoline insoluble content of 0%, and an H/C atomic ratio of 0.99 was sprayed at a rate of 600 g/hour using a gas-liquid binary fluid nozzle (type: AM12S-IS, manufactured by Atomax Co., Ltd.) immersed to a depth of about 5 cm in 5,000 ml of secondary butyl alcohol (SBA) in a 10 liter glass flask, with nitrogen being injected at a rate of 30 l/min. Spraying was stopped when the quantity of the naphtha cracking tar solution in the SBA was reached to about 18%. The entire slurry obtained was centrifuged at 2,000 rpm to separate the liquid from the solids. The solid materials obtained were equally divided into 5 portions. Each portion was dispersed again in any one of 1,000 ml of mixed solvent of SBA and methyl ethyl ketone (MEK) having following compositions:

Composition (SBA/MEK, vol/vol): 100/0, 80/20, 70/30, 60/40 or 50/50.

Each mixture was stirred for one hour and solid material was again separated from liquid by centrifuge, respectively. The resulting solids were mixed with 500 ml of methanol and centrifuged to separate the liquid from the solids. This operation was repeated three times. The solid matter finally obtained was dried at 60° C. under vacuum for three hours to obtain fine particles of a high-softening-point pitch. The yield of this pitch based on the naphtha cracking tar used as the starting material, the softening point, and the average particle diameter are shown in Table 2.

TABLE 2

| Solvent used for 2nd Extraction SBA/MEK (vol/vol) | Yield[1] wt. % | Softening Point ° C. | Average Particle Diameter $\mu$m |
|---|---|---|---|
| 100/0 | 28 | 194 | 6.3 |
| 80/20 | 24 | 207 | 6.7 |
| 70/30 | 23 | 212 | 6.3 |
| 60/40 | 21 | 220 | 6.4 |
| 50/50 | 19 | 223 | 6.3 |

[1]Yield based on the naphtha cracking tar used as the starting material.

From the table above, it can be understood that many types of high-softening-point pitch having different softening points can be prepared by the selection of extraction solvents used for extracting the light components. It can be recognized from the table above that when naphtha cracking tar, i.e. a heavy oil is used as the starting raw material, it is necessary to remove more than 50 wt. % of the light components from the micro-shaped material by extraction so as to obtain high-softening-point pitches having softening point measured by the temperature gradient method of 150° C. or higher.

The micro-particles obtained by the use of a mixed solvent having the composition (SBA/MEK, vol/vol) of 70/3 (see Table 2) had a specific surface area measured by BET 1 point method of 48 $m^2/g$, and pore volume of 101 $mm^3/g$.

Example 5

Figure 4:
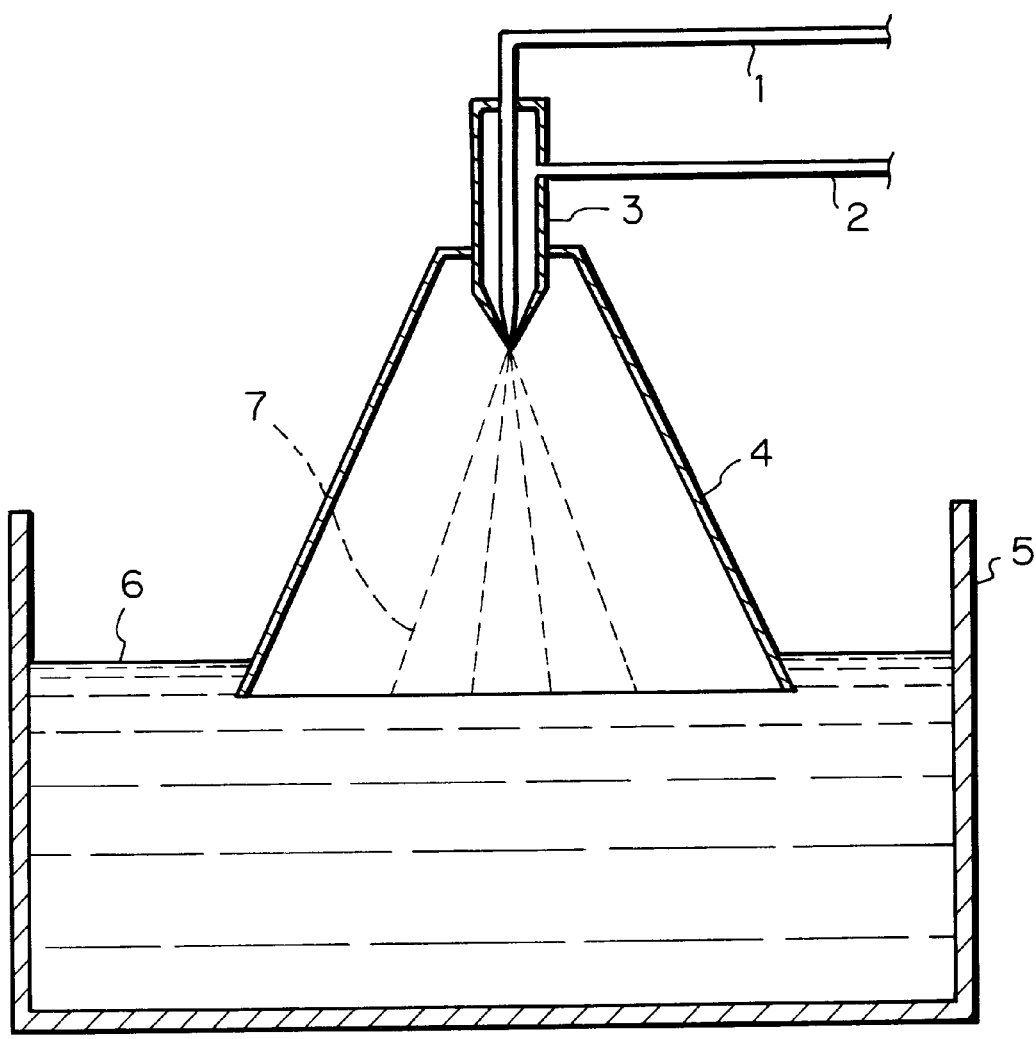
FIG. 4 is an explanatory drawing of the apparatus used in Example 5.

A conical stainless tell hood having a distance of spraying space of 180 mm was provided. A gas-liquid binary fluid nozzle (type: AM12S-IS, manufactured by Atomax Co., Ltd.) was secured to the top of conical stainless steel hood to fabricate jig for adjustment of the spraying space. The jig was placed in vessel made of stainless steel having a volume of 9 liters and containing 1,000 ml of SBA. The jig was secured in the stainless steel vessel so that the subordinate aperture of the jig was immersed in SBA to about 10 mm. The distance spraying space which is the distance form the spray nozzle to the surface of SBA was 180 mm. An outline of this apparatus is shown in FIG. 4. In the drawing, numeral 1 means a pipe for supplying a raw material, numeral 2 means a pipe for supplying a spraying gas, numeral 3 means a binary fluid type spraying nozzle, numeral 4 means a jig for adjusting the distance between the spraying nozzle and the surface of the organic solvent used, i.e.. distance fo spraying space, numeral 5 means a vessel for holding the organic solvent, numeral 6 means the surface of the organic solvent, and numeral 7 means paths of fine liquid droplets sprayed from the nozzle.

A naphtha cracking tar with a weight loss by heating up to 300° C. of 59.5% measured in a thermobalance, a viscosity of 1.8 poise at 30° C., a xylene insoluble content of 0%, a quinolone insoluble content of 0%, and an H/C atomic ratio of 0.99 was distilled under vacuum to obtain a low-softening-point pitch with a softening point of 71° C. measured by the temperature gradient method. The yield of this pitch based on the naphtha cracking tar was 52%. The pitch had a xylene insoluble content of 0%, a quinolone insoluble content of 0%, an elementary analysis values of C: 92.9% H: 7.0% S:0.02%, and an H/C atomic ratio of 0.90. Fifty parts by weight of xylene was mixed with fifty parts by weight of this low-softening-point pitch to dissolve the pitch and to produce a solution with a viscosity of 0.19 poise at 30° C.

Using the apparatus mentioned above, nitrogen and a pitch solution prepared just above were sprayed from the nozzle at a flow rate of 30 l/min (nitrogen) and 240 g/hour (the pitch solution), respectively. The spray was terminated when the quantity of the pitch solution oin the SBA was reached to about 11%. To the mixture 250 ml of MEK was added and stirred for one hour. Then, the entire amount of the resulting slurry was filtered through a G-4 glass filter, The solid material thus obtained was added to 1,000 ml of a mixed solvent having a composition of SBA/MEK (vol/vol) of 7/3, and stirred for one hour and again filtered. The residue which is a solid matter remaining on the filter was then washed with methanol and dried under vacuum to obtain micro-particles of the high-softening-point pitch.

The yield of the micro-particles thus obtained based on the low-softening-point pitch was 35%. The micro-particles thus obtained had a softening point measured by temperature gradient method of 226° C., and had an average particle diameter of 8.8 $\mu$m. Observation by a scanning electron microscope showed that the shapes of substantially all particles were spherical. The micro-particles had a specific surface area measured by BET 1 point method of 60 $m^2/g$, and pore volume of 125 $mm^3/g$.

Example 6

To 50 ml of ion exchanged water were added 2 g of the high-softening-point pitch obtained in Example 1 using n-pentanol as an extraction solvent and a commercially available anionic surface active agent in the amount of 1 g, as the effective components. The mixture was sufficiently stirred for more than 1 hour, followed by filtration by suction through a G-4 glass filter. The pitch obtained was dried for 5 hours under a reduced pressure at 60 ° C.

The weight of the pitch after drying was measured to calculate the yield for pitch before processing. The results are shown in Table 3

TABLE 3

| Anionic Surface Active Agent | Yield[1] wt. % |
|---|---|
| Sodium dodecylbenzenesulfonate (hard type)[2] | 115 |
| Sodium dodecylbenzenesulfonate (soft type)[3] | 116 |
| Sodium alkylnaphthalenesulfonate[4] | 113 |
| Sodium dialkylsulfosuccinate[5] | 114 |
| Sodium polyoxyethylene alkyl ether sulfate[6] | 123 |

[1]Yield of high-softening-point pitch after the adsorption of anionic surface active agent based on the high-softening-point pitch before processing.
[2]Neopelex No. 25 manufactured by Kao Corp.
[3]Neopelex F-25 manufactured by Kao Corp.
[4]Pelex NB-L manufactured by Kao Corp.
[5]Pelex CS manufactured by Kao Corp.
[6]Levenol WX manufactured by Kao Corp.

The table shows that the weight of the high-softening-point pitch after treatment with a surface active agent increased by 13% to 23 % according to the kind of surface active agent used. It was demonstrated that a high-softening-point pitch with a surface active agent adsorbed thereon can be obtained by the present invention.

Example 7

To a solution prepared in the same manner as in Example 6, except that sodium dodecylbenzensulfonate (hard type)

was used, was added 2 g of a high-softening-point pitch obtained in Example 1 by extraction using n-pentanol as a solvent. The mixture was stirred sufficiently for more than 1 hour to cause the high-softening-point pitch to adsorb the surface active agent. Next, solutions of metal salts shown in Table 4 were added to the resulting mixed solution in an amount whereby the concentration of the metal salts was twice mols that of the surface active agent. The mixture was stirred for 1 hour, followed by filtration through a G-4 glass filter, The pitch obtained was dried for 5 hours under a reduced pressure at 60° C.

The yield of the products obtained for the high-softening-point pitch before adsorption of surface active agents, and the contents of metal measured by a fluorescent X-ray analyzer and sulfur by an elementary analysis are shown in Table 4.

TABLE 4

| Metal Salt | Yield[1] wt. % | Metal Content[2] | wt. % | Sulfur Content[3] wt. % |
|---|---|---|---|---|
| None | 115 | — | | 1.41 |
| Co(AcO)$_2$ | 115 | Co | 0.73 | 1.23 |
| Mn(AcO)$_2$.4H$_2$O | 115 | Mn | 0.74 | 1.22 |
| Ca(AcO)$_2$.H$_2$O | 114 | Ca | 0.60 | 1.31 |
| Ba(AcO)$_2$ | 118 | Ba | 1.20 | 1.34 |
| FeSO$_4$.7H$_2$O | 116 | Fe | 0.76 | 1.30 |
| Ni(AcO)$_2$.4H$_2$O | 115 | Ni | 0.78 | 1.36 |
| CuCl$_2$.2H$_2$O | 116 | Cu | 0.72 | 1.32 |
| AgNO$_3$ | 117 | Ag | 1.18 | 1.24 |

[1]Yield of metal carrying high-softening-point pitch based on the high-softening-point pitch before processing with anionic surface active agent.
[2]Based on the high-softening-point pitch.
[3]Based on the high-softening-point pitch.

The table shows that a high-softening-point pitch with a metal carried thereon can be easily obtained by replacement of a cation of the surface active agent which has been adsorbed on the high-softening-point pitch having mesopores with a metal ion by the process of the present invention.

COMPARATIVE EXAMPLE 1

A metal was carried on the high-softening-point pitch in the same manner as in Example 7, except that polyoxyethylene nonylphenyl ether (Emulgen 985, tradename, manufactured by Kao Corp.) which is a nonioinic surface active agent was used as the surface active agent and calcium acetate monohydrate was used as a metal salt. The yield of the product obtained for the high-softening-point pitch before adsorption of surface active agent was 116%, and the metal content measured by a fluorescent X-ray analyzer was 0.06%. These results indicate that when a nonionic surface active agent is used, the surface active agent can be adsorbed, but almost no metal ion is replaced. The amount of the metal carried is extremely small as compared with the case where an anionic surface active agent is used.

Example 8

Aqueous solution of cobalt acetate with different cobalt ion concentrations (from 0.006 to 0.224%) were prepared by dissolving a specified amount of cobalt acetate in 25 to 400 ml of ion exchanged water. 2 g of a high-softening-point pitch on which sodium dodecylbenzensulfonate (hard type) had been adsorbed, which was obtained in the same manner as in Example 6, was added to this aqueous solution. The mixture was stirred for 30 minutes, and the mixture was filtered through a G-4 glass filter with suction until all liquid had been separated. The pitch obtained was dried under a reduced pressure at 60° C. The cobalt content was measured by a fluorescent X-ray analyzer. The results are shown in Table 5.

TABLE 5

| Cobalt Ion Concentration[1] wt. % | Amount of Aqueous Solution ml | Amount of Cobalt Ion[2] wt. % | Cobalt Content[3] wt. % |
|---|---|---|---|
| 0.011 | 50 | 0.29 | 0.20 |
| 0.027 | 50 | 0.68 | 0.48 |
| 0.048 | 50 | 1.21 | 0.55 |
| 0.098 | 50 | 2.44 | 0.61 |
| 0.224 | 50 | 5.60 | 0.63 |
| 0.006 | 400 | 1.21 | 0.55 |
| 0.012 | 200 | 1.21 | 0.59 |
| 0.024 | 100 | 1.21 | 0.58 |
| 0.097 | 25 | 1.21 | 0.55 |

[1]Cobalt ion concentration in the aqueous solution of cobalt acetate.
[2]Amount of cobalt ion contained in the aqueous solution based on the amount of the high-softening-point pitch.
[3]Cobalt content adsorbed on the high-softening-point pitch.

It can be seen from the table that a high-softening-point pitch carrying a metal can be obtained even by the method of adding a high-softening-point pitch on which an anionic surface active agent has been adsorbed to an aqueous solution of a metal salt, and that the amount of metal carried on the high-softening-point pitch is affected by the amount of metal ion existing in the system rather than by the concentration of the metal salt. In the case of this example, the amount of metal carried on the high-softening-point pitch is almost constant if the amount of metal ion existed in the system is 1.2% or more based on the amount of the high-softening-point pitch.

Example 9

High-softening-point pitches carrying a metal, prepared in the same manner as in Example 7 using iron (II) sulfate heptahydrate (FeSO$_4$.7H$_2$O), cobalt (II) acetate (Co(CH$_3$COO)$_2$), manganese (II) acetate tetrahydrate (Mn(CH$_3$COO)$_2$.4H$_2$O), or calcium acetate monohydrate (Ca(CH$_3$COO)$_2$.H$_2$O) as metal salts, were stabilized by heating at a rate of 0.5° C. /min in air to a prescribed temperature of between 245° C. and 365° C. and being maintained at this temperature for 1 hour. These stabilized materials were heated to 1,000° C. at a rate of 10° C./min in a nitrogen atmosphere and maintained for 1 hour, thus providing carbonized materials.

The yield of stabilized and carbonized products for high-softening-point pitches carrying a metal, the specific surface area of the carbonized materials by the BET 1 point method, and the metal contents of the carbonized products by fluorescent X-ray analyzer were measured. The results are shown in Table 6.

TABLE 6

| | | | | Carbonized Material | |
| Kind of Metal | Stabilizing Temperature ° C. | Yield after Stabilized wt. % | Yield after Carbonized wt. % | SA(BET) m$^2$/g | Metal Content wt. % |
|---|---|---|---|---|---|
| Fe | 245 | 102 | 63 | 56 | 1.65 |
| | 255 | 8 | — | — | — |
| Co | 255 | 102 | 63 | 26 | 1.39 |
| | 295 | 96 | 58 | 171 | 1.47 |
| | 305 | 92 | 59 | 310 | — |
| | 325 | 84 | 59 | 367 | 1.68 |

TABLE 6-continued

| Kind of Metal | Stabilizing Temperature ° C. | Yield after Stabilized wt. % | Yield after Carbonized wt. % | SA(BET) m²/g | Metal Content wt. % |
|---|---|---|---|---|---|
|  | 345 | 67 | 58 | 347 | 1.73 |
|  | 355 | 7 | — | — | — |
|  | 365 | 6 | — | — | — |
| Mn | 255 | 102 | 62 | 2 | 1.61 |
|  | 295 | 96 | 58 | 101 | — |
|  | 305 | 92 | 58 | 156 | 1.82 |
|  | 325 | 86 | 57 | 195 | — |
|  | 345 | 77 | 56 | 223 | — |
|  | 355 | 71 | 56 | 224 | 2.38 |
|  | 365 | 15 | — | — | — |
| Ca | 255 | 100 | 61 | 3 | 1.32 |
|  | 295 | 93 | 58 | 33 | — |
|  | 305 | 90 | 57 | 144 | 1.48 |
|  | 325 | 84 | 56 | 305 | — |
|  | 345 | 75 | 55 | 331 | — |
|  | 365 | 67 | 55 | 337 | 1.93 |

It can be seen from this table that there is a temperature range in which sudden combustion occurs, resulting in a decrease in the yield according to the type of the metal, and that the specific surface area of the carbonized products differs accordingly to the type of metal carried. Specifically, the behavior during stabilization and carbonization is greatly affected by causing the high-softening-point pitch to carry a metal.

Figure 5:
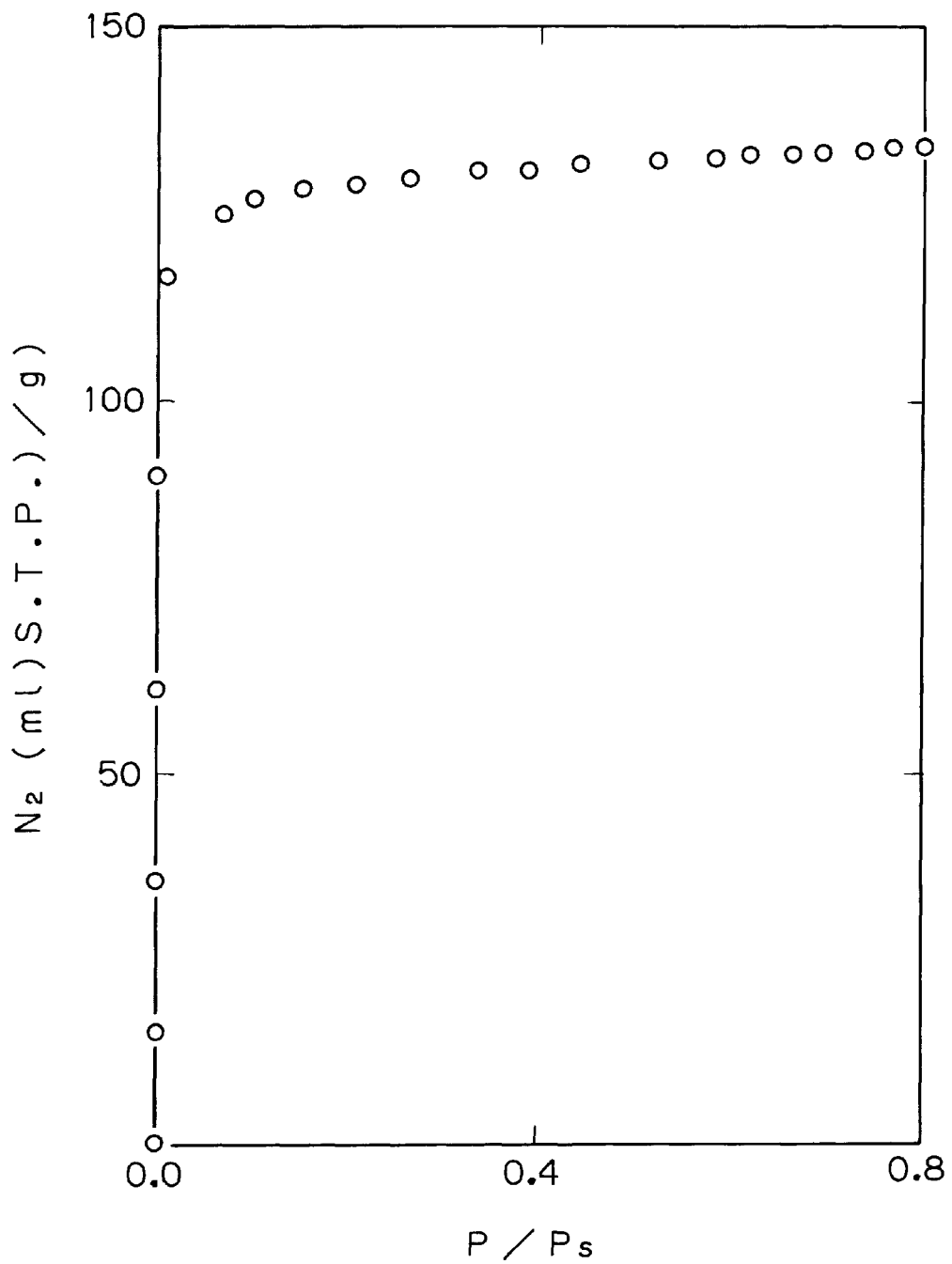
FIG. 5 is a nitrogen adsorption isotherm at liquid nitrogen temperature relative to the carbon material carrying cobalt obtained by a stabilization temperature of 345° C. and carbonization temperature of 1,000° C. in Example 9.
Figure 6:
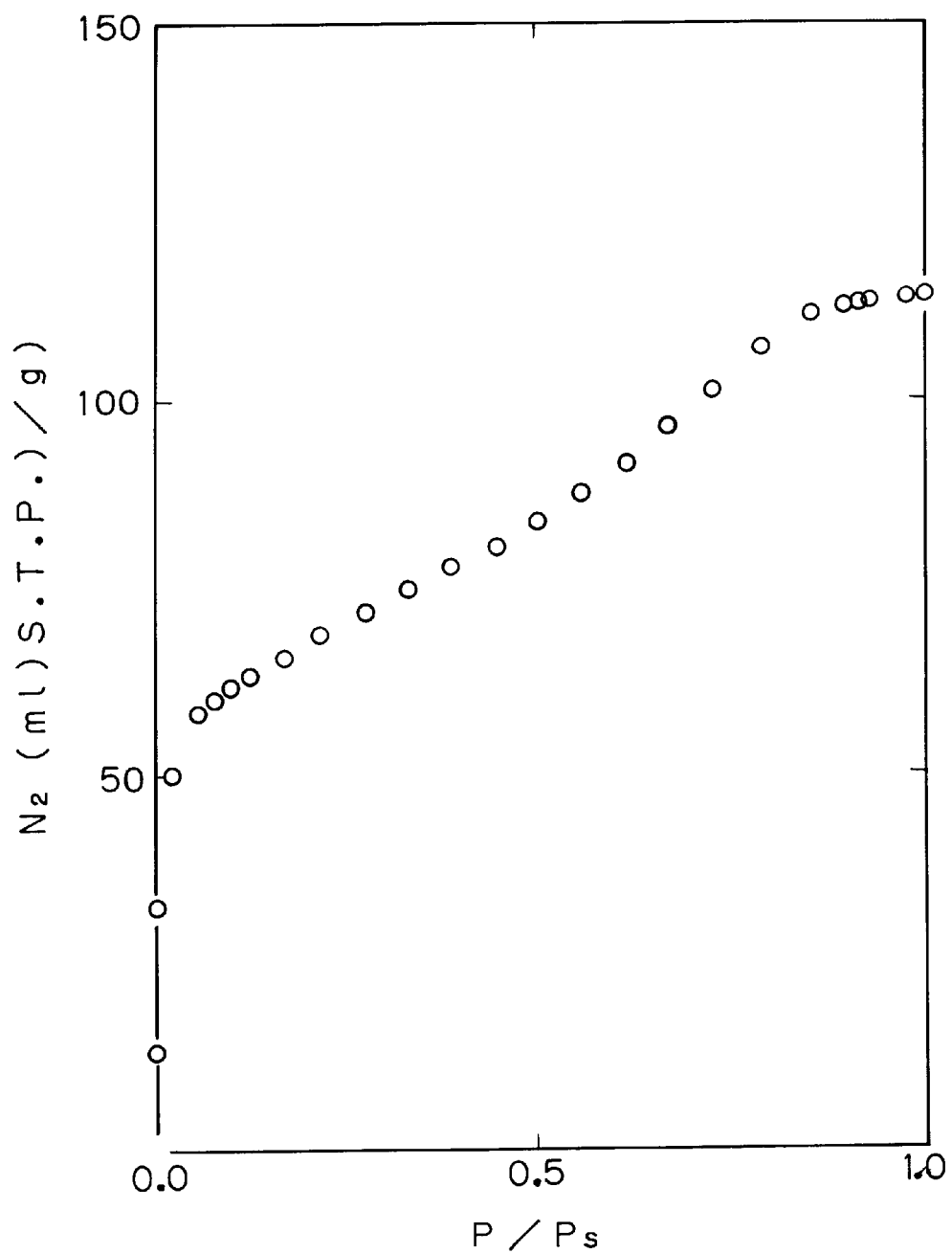
FIG. 6 is a nitrogen adsorption isotherm at liquid nitrogen temperature relative to the carbon material carrying manganese obtained by a stabilization temperature of 345° C. and carbonization temperature of 1,000° C. in Example 9.

Adsorption isotherms were measured in the same manner as in Example 1 on the products obtained from raw materials with cobalt or manganese carried thereon by stabilization at 345° C., followed by carbonization at 1,000° C. These adsorption isotherms are shown in FIG. 5 and FIG. 6, which clearly indicate that the generation of pores differs according to the metal carried. Specifically, almost complete adsorption of nitrogen has occurred at points where the relative pressure (P/Ps) at the time of measurement is small in the products on which cobalt has been carried, whereas the product on which manganese has been carried exhibited gradual adsorption of nitrogen over a broader area.

Figure 7:
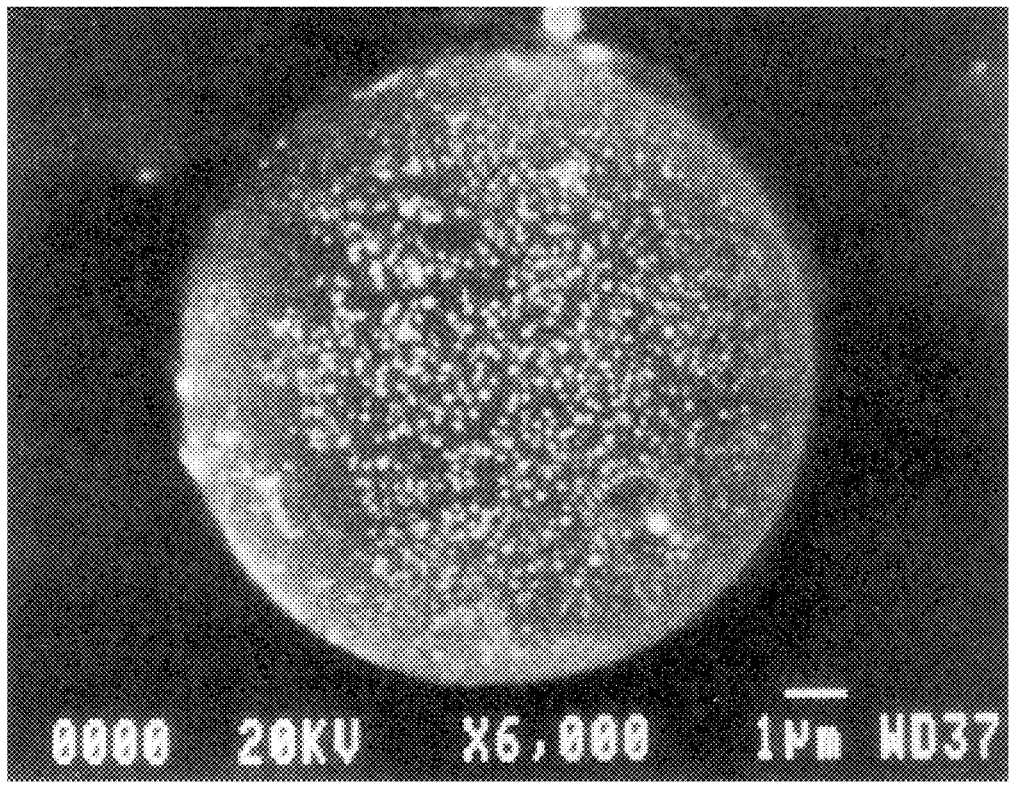
FIG. 7 is reflection electron image observation using a scanning-type electron microscope (SEM) on the product obtained from raw material carrying cobalt by stabilization at 345° C., followed by carbonization at 1,000° C. in Example 9, at an image along the section at right angles to the fiber axis of a fibrous specimen.

Dispersion of cobalt was observed by reflection electron image observation using a scanning-type electron microscope (SEM) on the product obtained form raw materials with cobalt or manganese carried thereon by stabilization at 345° C., followed by carbonization at 1,000° C. An image along the section at right angles to the fiber axis of a fibrous specimen is shown in FIG. 7, which indicates that the metallic cobalt sufficiently diffused inside the fiber, and is not being merely attached to the outer surface thereof. In the figure, white dots are the reflections of metallic cobalt.

Example 10

High-softening-point pitches carrying cobalt, manganese, nickel, or copper, prepared in the same manner as in Example 7, and a high-softening-point pitch which carried no metal were heated to 340° C. at a rate of 0.5° C./min, and maintained for 1 hour at this temperature, thereby stabilizing the pitches. The stabilized materials are then heated to 800° C. at a rate of 10° C./min in a 100% carbon dioxide gas atmosphere, and maintained at this temperature for 1 hour, thus providing carbonized materials.

The yields of the carbonized materials for high-softening-point pitches and the specific surface areas measured by the BET 1 point method are shown in Table 7.

TABLE 7

| | Kind of Metal carried | | | | |
|---|---|---|---|---|---|
| | Co | Mn | Ni | Cu | None |
| Yield of Carbonized Material wt. % | 16 | 20 | 25 | 48 | 53 |
| Specific Surface Area m²/g | 661 | 662 | 618 | 532 | 424 |

It can be seen from the table that a carbonized material with minute pores having a larger specific surface area can be obtained when the raw material is carbonized in an oxidative atmosphere rather than in an inert atmosphere, and that both the yield and the specific surface area differ according to the type of metal carried due to different rates of activation reaction in these metals.

Example 11

High-softening-point pitches carrying cobalt or manganese, prepared in the same manner as in Example 7, and a high-softening-point pitch which carried no metal were heated to 340° C. at a rate of 0.5° C./min in the air and maintained for 1 hour at this temperature to obtain stabilized materials. Next, these stabilized materials were calcined for 1 hour in a nitrogen atmosphere at temperature of 1,000° C., 2,000° C., and 2,700° C.

Figure 8:
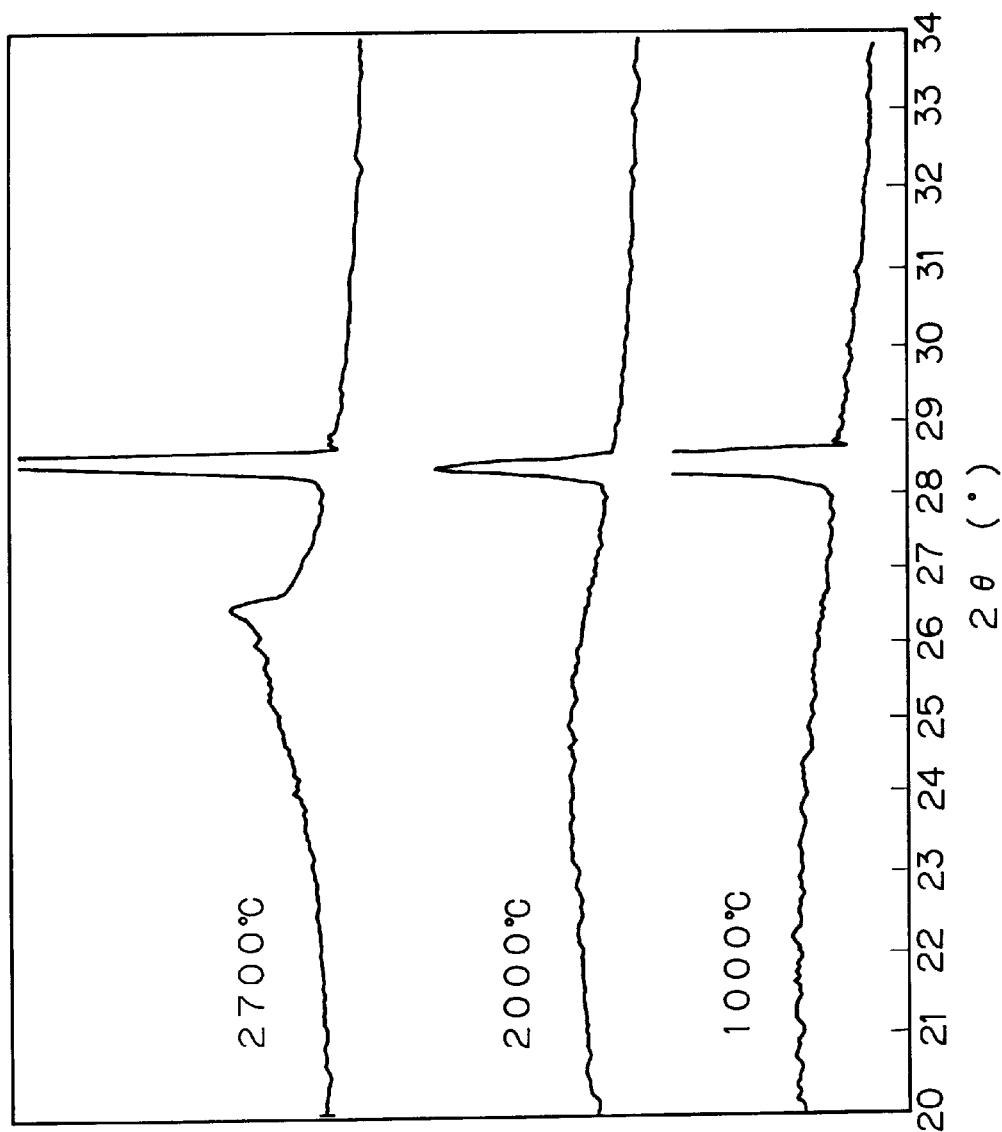
FIG. 8 is a profile of (002) diffraction measured by X-ray diffraction of the carbonized material carrying no metal in Example 11.
Figure 9:
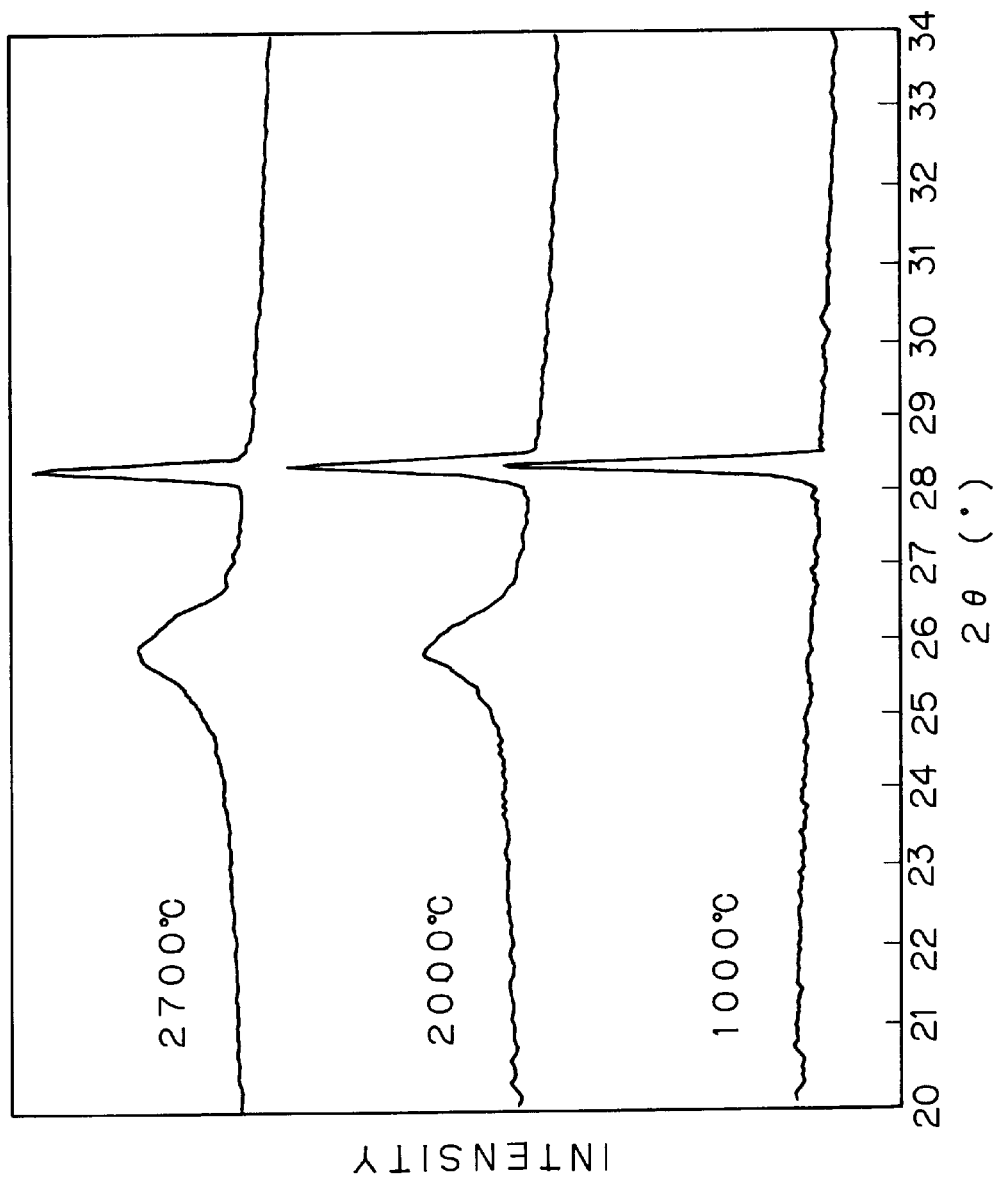
FIG. 9 is a profile of (002) diffraction measured by X-ray diffraction of the carbonized or graphitized material carrying cobalt in Example 11.
Figure 10:
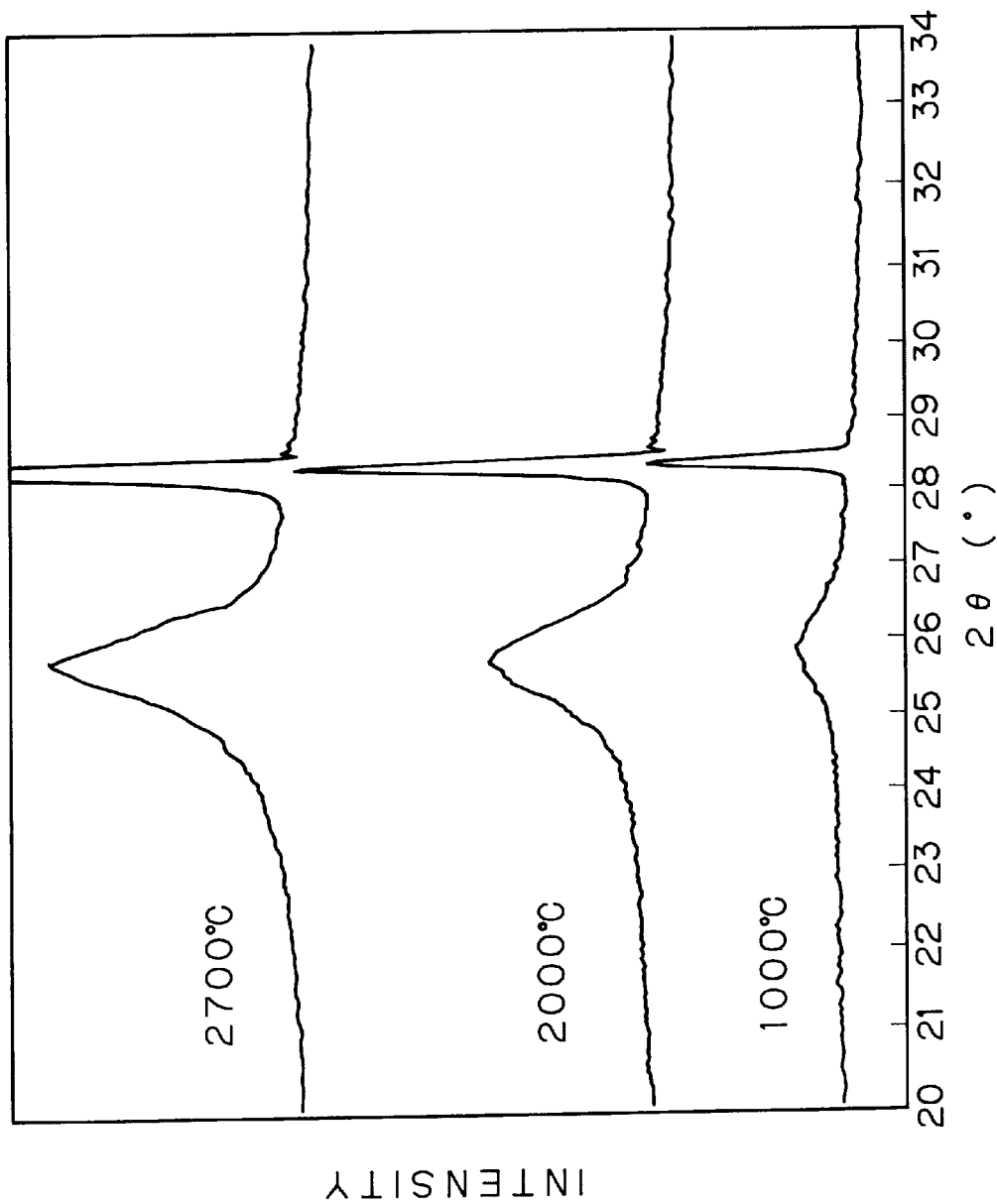
FIG. 10 is a profile of (002) diffraction measured by X-ray diffraction of the carbonized or graphitized material carrying manganese in Example 11.

Profiles of (002) diffraction measured by X-ray diffraction of the resulting carbonized materials or graphitized materials are shown in FIGS. 8, 9 and 10.

It can be seen from these figures that the product with no metal carried thereon shown in FIG. 8 exhibits a compounded (002) diffraction consisting of a very broad diffraction near 26° and a small diffraction close to 26.5" (corresponding to graphite crystal), even if this material has been treated at the high temperature of 2,700° C. This indicates that this product has a low crystallinity as a whole. In the other hand, graphitized materials made form high-softening-point pitches carrying cobalt or manganese by calcining at 2,000° C. or 2,700° C. (FIGS. 9 and 10) have a markedly large diffraction near 26", clearly indicating high crystallinity of these graphite materials.

Example 12

2:5 g of stabilized material (stabilization temperature: 345° C.) carrying calcium obtained in the same manner as in Example 9 was mixed with 2.5 g of a high-softening-point pitch carrying calcium prepared in the same manner as in Example 7. 3 ml of xylene was added to the mixture and sufficiently kneaded while dissolving the high-softening-point pitch. The kneaded material was dried at 60° C. under a reduced pressure to remove xylene, thereby obtained a molding raw material. After pulverizing to 35 mesh or smaller using a mortar, 0.2 g of this molding raw material was introduced into a mold with a diameter of 13 mm and press-molded under a pressure of 500 Kg/cm².G, to obtain a molded article with a thickness of 1.35 mm and a bulk density of 1.10 g/cm³.

Next, this molded article was heated in air to 100° C. over 1 hour, then to 255° C. in 5 hours and 10 minutes, and maintained at 255° C. for 1 hour. A stabilized molded article with a bulk density of 1.27 g/cm³ was obtained at a yield of 97% for the weight of molded article before stabilization.

This stabilized material was further heated to 1,000° C. at a rate of 10° C./min in a nitrogen atmosphere and maintained at this temperature for 1 hour to obtain a carbonized molded article. A carbonized molded article with a bulk density of 0.776 g/cm³ was obtained at a yield of 56% for the stabilized molded article. This product was hard enough that it was not crushed by pressing with the tip of a finger.

We claim:

1. A process for preparing carbonaceous material carrying ultrafinely dispersed metal comprising the steps of:
    obtaining a starting material comprising one selected from the group consisting of a heavy oil having an H/C atomic ratio in the range of between about 0.8 and 1.2 and substantially free from components insoluble in BTX solvent, and a low-softening-point pitch derived from said heavy oil by distilling off light components therefrom;
    shaping the starting material into a micro-shaped material comprising a form selected from the group consisting of particles, liquid particles, powders, and fibers having a size of 100 µm or less,
    contacting the micro-shaped material with an organic solvent which allows at least 10 wt. % of the micro-shaped material to remain insoluble as insoluble components, and extracting 20–90 wt. % of the light components contained in the micro-shaped material so as to obtain a high softening point pitch which has a softening point of 150° C. or higher when measured by the temperature gradient method, undergoing a weight loss of 5 wt. % or less when heated up to 300° C., and has mesopores of 100 mm³/g or greater, in terms of minute pore volume calculated by the Dollimore-Heal method from an adsorption isotherm of nitrogen at liquid nitrogen temperature;
    contacting this high-softening-point pitch with an anionic surface active agent to obtain a high-softening-point pitch on which the anionic surface active agent has been adsorbed;
    forming an aqueous solution incorporating a metal salt; and
    bringing this high-softening-point pitch on which the anionic surface active agent has been adsorbed into contact with the aqueous solution of a metal salt to replace the cation of the surface active agent with the metal ion.

2. The process according to claim 1, wherein the starting material is formed into a micro-shaped material by employing a forming process selected from the group consisting of pulverization, melt spinning, emulsification, membrane emulsification, and spraying.

3. The process according to claim 1, wherein the heavy oil comprises a cracked heavy oil of petroleum origin selected from the group consisting of heavy oils obtained as a by-product when olefins are manufactured by the thermal cracking of naphtha or gas oil, and heavy oils obtained as a by-product when hydrocarbons are cracked by fluid catalytic cracking.

4. The process according to claim 1, wherein the organic solvent used in the second step comprises at least one selected form the group consisting of paraffinic hydrocarbons, alcohols, ketones, and a mixed solvent comprising a mixture of at least one of these solvents and BTX solvent.

5. The process according to claim 4, wherein the organic solvent comprises at least one selected from the group consisting of n-pentane, cyclopentane, n-hexane, isohexane, cyclohexane, n-heptane, isooctane, methanol, ethanol, n-propanol, isopropanol, n-butanol, sec-butanol, n-pentanol, n-hexanol, cyclohexanol, acetone, methyl ethyl ketone, diethyl ketone, methyl isopropyl ketone, methyl isobutyl ketone, and a mixed solvent comprising a mixture of at least one of these solvents and BTX solvent.

6. The process according to claim 1, wherein the starting material is formed into a micro-shaped material by employing a process selected from the group consisting of emulsification and membrane emulsification, and the organic solvent used in the second step is a water soluble organic solvent comprising at least one selected from the group consisting of alcohols, ketones, and a water soluble mixed solvent comprising a mixture of at least one of these solvents and BTX solvent.

7. The process according to claim 1, wherein the starting material is formed into a micro-shaped material by employing a process selected from the group consisting of emulsification, membrane emulsification, and spraying and in the first step, at leas tone diluting organic solvent is used, or a diluent which, being mutually soluble with water, can dissolve 90 wt. % or more of the raw material heavy oil, and is selected from the group consisting of benzene, toluene, xylene, ethylbenzene, carbon tetrachloride, chloroform, trichloroethylene, tar gas oil or carbonyl oil obtained from coal tar and gasoline fraction or gas oil produced by the cracking of naphtha.

8. The processing according to claim 7, wherein the extracting solvent is further defined as being able to remove any diluting solvent existing in said heavy oil.

9. A process according to claim 1, wherein the metal salt is a metal salt capable of producing metal ions when dissolved in water, and is selected from the group consisting of sulfates, nitrates, chlorides and acetates.

10. A process for manufacturing a stabilized carbon carbonaceous material carrying ultrafinely dispersed metal thereon, which comprises stabilizing a high-softening-point pitch carrying a metal thereon prepared by the steps of:
    obtaining a starting material comprising one selected from the group consisting of a heavy oil having an H/C atomic ratio in the range of between about 0.8 and 1.2 and substantially free from components insoluble in BTX solvent, and a low-softening-point pitch derived from said heavy oil by distilling off light components therefrom;
    shaping the starting material into a micro-shaped material comprising a form selected from the group consisting of particles, liquid particles, powders, and fibers having a size of 100 µm or less;
    contacting the micro-shaped material with an organic solvent which allows at least 10 wt. % of the micro-shaped material to remain insoluble as insoluble components, and extracting 20 to 90 wt. % of the light components contained in the micro-shaped material thereby obtaining a high-softening-point pitch having a softening point of 150° C. or higher when measured by the temperature gradient method, undergoing a weight loss of 5 wt. % or less when heated up to 300° C., and has mesopores of 100 mm³/g or greater, in terms of minute pore volume calculated by the Dollimore-Heal method from an adsorption isotherm of nitrogen at liquid nitrogen temperature;
    contacting this high-softening-point pitch with an anionic surface active agent to obtain a high-softening-point pitch on which the anionic surface active agent has been adsorbed;
    forming an aqueous solution incorporating a metal salt; and
    bringing this high-softening-point pitch on which the anionic surface active agent has been adsorbed into contact with the aqueous solution of a metal salt to replace the cation of the surface active agent with the metal ion by heating under an atmosphere containing oxygen.

11. A process for manufacturing a carbide material carrying ultrafinely dispersed metal thereon, which comprises thermally treating a stabilized carbon material carrying a metal thereon, which is obtained by stabilizing a high-softening-point pitch carrying a metal prepared by the steps of:

obtaining a starting material comprising one selected from the group consisting of a heavy oil having an H/C atomic ratio in the range of between about 0.8 and 1.2 and substantially free from components insoluble in BTX solvent, and a low-softening-point pitch derived from said heavy oil by distilling off light components therefrom, shaping the starting material into a micro-shaped material comprising a form selected from the group consisting of particles, liquid particles, powders, and fibers having a size of 100 μm or less;

contacting the micro-shaped material with an organic solvent which allows at least 10 wt. % of the micro-shaped material to remain insoluble as insoluble components, and extracting 20 to 90 wt. % of the light components contained in the micro-shaped material thereby obtaining a high-softening-point pitch having a softening point of 150 ° C. or higher when measured by the temperature gradient method, undergoing a weight loss of 5 wt. % or less when heated up to 300° C., and has mesopores of 100 mm$^3$/g or greater, in terms of minute pore volume calculated by the Dollimore-Heal method from an adsorption isotherm of nitrogen at liquid nitrogen temperature;

contacting this high-softening-point pitch with an anionic surface active agent to obtain a high-softening-point pitch on which the anionic surface active agent has been absorbed;

forming an aqueous solution incorporating a metal salt; and bringing this high-softening-point pitch on which the anionic surface active agent has been adsorbed into contact with the aqueous solution of a metal salt to replace the cation of the surface active agent with the metal ion by heating under one condition selected from the group consisting of an atmosphere containing oxygen, an inert atmosphere at a temperature of between about 500° C. and 3,000° C., and an atmosphere containing at least one oxidative gas selected from the group consisting of steam and carbon dioxide at a temperature of between about 500° and 1,500° C.

12. A process for manufacturing a molded article of a carbonaceous material with ultrafinely dispersed metal carried thereon comprising the steps of:

molding an article using a stabilized carbonaceous material carrying a metal which is obtained by stabilizing a high-softening-point pitch carrying a metal thereon prepared by the steps of:

obtaining a starting material comprising one selected from the group consisting of a heavy oil having an H/C atomic ration in the range of between about 0.8 and 1.2 and substantially free from components insoluble in BTX solvent, and a low-softening-point pitch derived from said heavy oil by distilling off light components therefrom, shaping the starting material into a micro-shaped material comprising a form selected from the group consisting of particles, liquid particles, powders, and fibers having a size of 100 μm or less;

contacting the micro-shaped material with an organic solvent which allows at least 10 wt. % of the micro-shaped material to remain insoluble as insoluble components, and extracting 20 to 90 wt. % of the light components contained in the micro-shaped material thereby obtaining a high-softening-point pitch having a softening point of 150° C. or higher when measured by the temperature gradient method, undergoing a weight loss of 5 wt. % or less when heated up to 300° C., and has mesopores of 100 mm$^3$/g or greater, in terms of minute pore volume calculated by the Dollimore-Heat method from an adsorption isotherm of nitrogen at liquid nitrogen temperature;

contacting this high-softening-point with an anionic surface active agent to obtain a high-softening point pitch on which the anionic surface active agent has been absorbed; and forming an aqueous solution incorporating a metal ion; and bringing this high-softening-point pitch on which the anionic surface active agent has been adsorbed into contact with the aqueous solution of a metal salt to replace the cation of the surface active agent with the metal ion by heating under one condition selected form the group consisting of an atmosphere containing oxygen, an inert atmosphere at a temperature of between about 500° C. and 3,000° C., and an atmosphere containing at least one oxidative gas selected form the group consisting of steam and carbon dioxide at a temperature of from 500° C. and 1,500° C. and intermixing therewith at least one selected from the group consisting of a carbide carrying a metal which is obtained by stabilizing a high-softening-point pitch carrying a metal thereon prepared by the steps as above, as a filler, and a high-softening-point pitch carrying a metal obtained by the above steps as a binder, and processing said molded article by employing one selected from the group consisting of stabilization, carbonization, and graphitization.

* * * * *